United States Patent [19]

Athanas et al.

[11] Patent Number: 5,092,626
[45] Date of Patent: Mar. 3, 1992

[54] APPARATUS FOR CONTROLLING THE DAMPING OF A SHOCK ABSORBER

[75] Inventors: David S. Athanas, Toledo, Ohio; Gary W. Groves, Monroe; Fahrey M. Hammoud, Woodhaven, both of Mich.; David L. Perry, Sylvania, Ohio; Ray A. Sackett; Charles E. Tyrrell, both of Monroe, Mich.

[73] Assignee: Monroe Auto Equipment Company, Monroe, Mich.

[21] Appl. No.: 509,566

[22] Filed: Apr. 16, 1990

Related U.S. Application Data

[63] Continuation-in-part of Ser. No. 322,774, Mar. 13, 1989, Pat. No. 5,016,908.

[51] Int. Cl.$^5$ ............................................. B60G 17/08
[52] U.S. Cl. ................................... 280/707; 280/714; 188/299; 188/317
[58] Field of Search ................. 280/707, 714; 188/299, 188/317, 282, 322.15

[56] References Cited

U.S. PATENT DOCUMENTS

| | | |
|---|---|---|
| 3,039,566 | 6/1962 | Rumsey . |
| 3,124,368 | 3/1964 | Corley et al. . |
| 4,065,154 | 12/1977 | Glaze . |
| 4,113,072 | 9/1978 | Palmer . |
| 4,333,668 | 6/1982 | Hendrickson et al. . |
| 4,468,050 | 8/1984 | Woods et al. . |
| 4,474,271 | 10/1984 | Molders ........................... 188/317 |
| 4,534,580 | 8/1985 | Kobayashi et al. . |
| 4,600,215 | 7/1986 | Kuroki et al. . |
| 4,638,896 | 1/1987 | Poyser . |
| 4,660,686 | 4/1987 | Munning et al. . |
| 4,682,675 | 7/1987 | Eddy, Jr. . |
| 4,696,379 | 9/1987 | Yamamoto et al. . |
| 4,723,640 | 2/1988 | Beck . |
| 4,726,453 | 2/1988 | Obstfelder et al. . |
| 4,732,408 | 3/1988 | Ohlin . |
| 4,749,070 | 6/1988 | Moser . |
| 4,754,855 | 7/1988 | Kuwana ............................ 188/299 |

FOREIGN PATENT DOCUMENTS

| | | |
|---|---|---|
| 0166313 | 1/1986 | European Pat. Off. . |
| 1505417 | 3/1970 | Fed. Rep. of Germany . |
| 3425988 | 1/1986 | Fed. Rep. of Germany . |
| 1095506 | 12/1954 | France . |
| 1130621 | 10/1956 | France . |
| 57-173632 | 10/1982 | Japan . |
| 59-128941 | 8/1984 | Japan . |
| 8600212 | 11/1986 | PCT Int'l Appl. . |
| 87/07565 | 12/1987 | PCT Int'l Appl. ................. 280/707 |
| 2159917A | 7/1984 | United Kingdom . |

*Primary Examiner*—Charles A. Marmor
*Assistant Examiner*—Karin Tyson
*Attorney, Agent, or Firm*—Harness, Dickey & Pierce

[57] ABSTRACT

An apparatus for damping the movement of the body of an automobile. The apparatus includes a shock absorber having a pressure cylinder which forms a working chamber having first and second portions operable to store damping fluid. The apparatus further includes a piston assembly disposed in the pressure cylinder and having a valve body forming first and second flow passage for providing fluid communication between the first and second portions of the working chamber. The valve body forming first and second annular recesses adjacent the first and second portions, respectively, of the working chamber. The apparatus further including a first unloader disposed within the first annular recess and which is operable for controlling the flow of damping fluid through the first flow passage from the second portion to the first portion of the working chamber during compression. The first unloader is adapted to regulate the flow of fluid through the first flow passage in response to pressure acting on a first valve member within the first recess. In addition, a second unloader is provided for controlling the flow of damping fluid thorugh the second flow passage from the first portion to the second portion of the working chamber during rebound. The second unloader is disposed in the second annular recess and is operable for regulating the flow of damping fluid through the second flow passage in response to pressure of the damping fluid acting on a second valve member within the second annular recess. A first flow path fluidly interconnects the first and second annular recesses. An electrically controlled solenoid is disposed within the first flow path and is operable for regulating the flow of damping fluid therein between the first and second annular recesses. The solenoid includes a plunger moveable between a first and second position for generating firm damping during compression and rebound by inhibiting the flow of fluid through the first flow path when the plunger is in the first position.

19 Claims, 16 Drawing Sheets

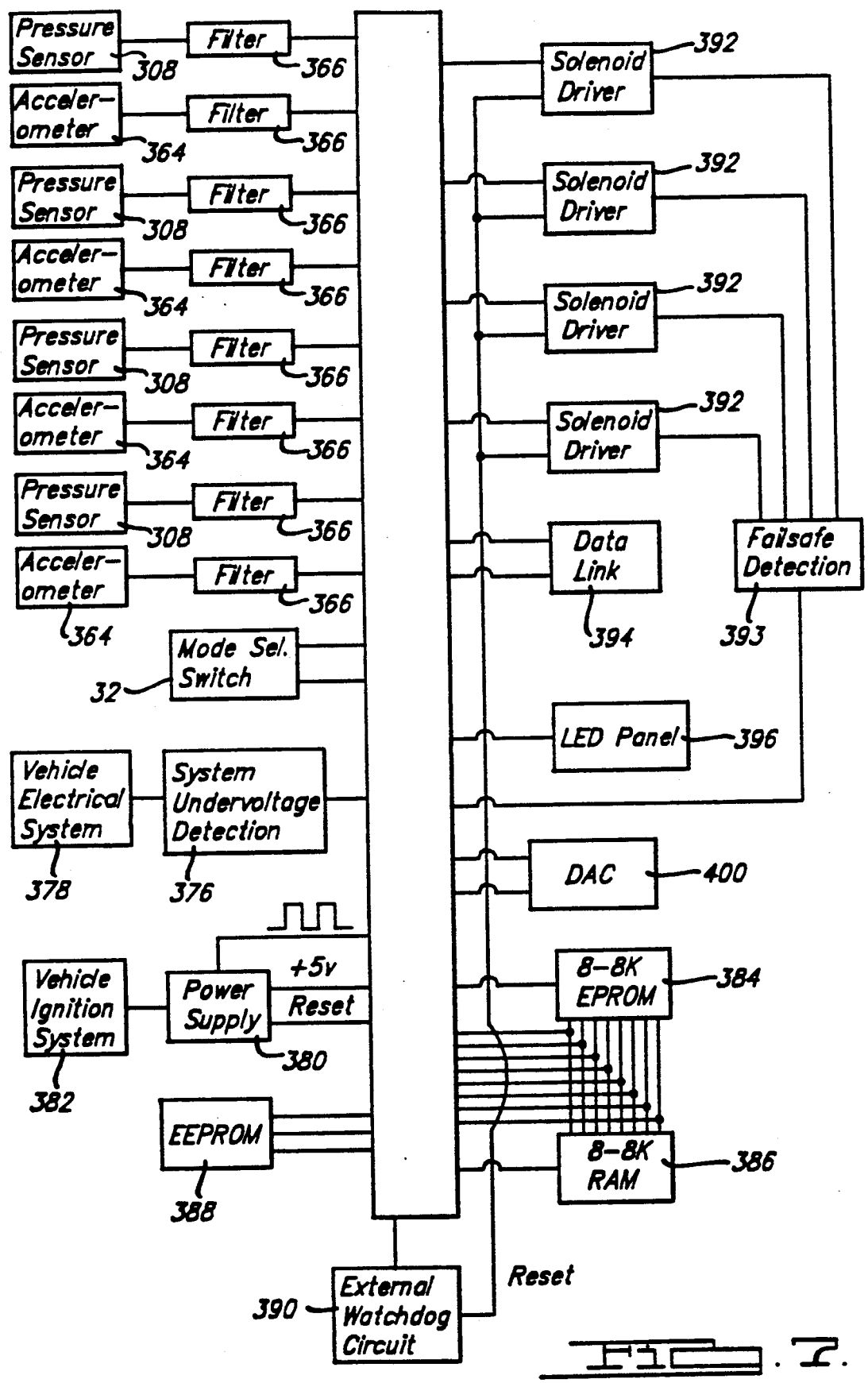

APPARATUS FOR CONTROLLING THE DAMPING OF A SHOCK ABSORBER

CROSS-REFERENCE TO RELATED APPLICATION

This application is a continuation-in-part of U.S. application Ser. No. 322,774, filed Mar. 13, 1989 now U.S. Pat. No. 5,016,903.

BACKGROUND OF THE INVENTION

1. Field of the Invention

This invention relates to suspension systems for automobiles and machines which receive mechanical shock, and more particularly to a method and apparatus for controlling shock absorbers.

2. Description of Related Art

Shock absorbers are used in connection with automotive suspension systems to absorb unwanted vibrations which occur during driving. To dampen unwanted vibrations, shock absorbers are generally connected between the body and the suspension of the automobile. A piston assembly is located within the shock absorber and is connected to the body of the automobile through a piston rod. Because the piston assembly is able to limit the flow of damping fluid within the working chamber of the shock absorber when the shock absorber is compressed or extended, the shock absorber is able to provide a damping force which "smooths" or "dampens" vibrations transmitted from the suspension to the body.

The greater the degree to which the flow of damping fluid within the working chamber is restricted by the piston assembly, the greater the damping forces which are provided by the shock absorber. Accordingly, a "soft" compression and rebound stroke is produced when the flow of damping fluid in the working chamber is relatively unrestricted. In contrast, a "firm" compression and rebound stroke is produced when there is an increased restriction in the flow of damping fluid in the working chamber.

In selecting the amount of damping that a shock absorber is to provide, three vehicle performance characteristics are often considered: ride comfort, vehicle handling and road holding ability. Ride comfort is often a function of the spring constant of the main springs of the vehicle, as well as the spring constant of the seat, tires, and the damping of the shock absorbers. Vehicle handling is related to the variation in the vehicle's attitude (i.e., roll, pitch and yaw). For optimum vehicle handling, relatively large damping forces are required to avoid excessively rapid variation in the vehicle's attitude during cornering, acceleration, and deceleration. Road holding ability is generally a function of the amount of contact between the tires and the ground. To optimize road holding ability, large damping forces are required when driving on irregular surfaces to prevent loss of contact between the wheels and the ground for an excessive period of time.

Because different driving characteristics depend on the amount of damping forces the shock absorber provides, it is often desirable to have a shock absorber in which the amount of damping forces generated by the shock absorber is adjustable. One method for selectively changing the damping characteristics of a shock absorber is disclosed in European Patent Application Publication No. 0 186 908 A2. In European Patent Application Publication No. 0 186 908 A2, a controller detects the distance between the body of the automobile and the front wheel so as to determine the contour of the surface. A rotary valve in each of the rear shock absorbers is then adjusted so that the rear shock absorbers are able to provide the desired amount of damping forces.

Another method for selectively changing the damping characteristics of a shock absorber is disclosed in PCT International Publication No. WO 88/06983. In PCT International Publication No. WO 88/06983, the shock absorber has a solenoid which controls the flow of damping fluid into pressure chambers which are located adjacent to valve disks which control the damping characteristics of the shock absorber. Upon movement of the plunger of the solenoid, the pressure in these pressure chambers changes so that the damping characteristics of the shock absorber may be varied.

SUMMARY OF THE INVENTION

Accordingly, it is the primary object of the present invention to provide an and apparatus for controlling shock absorbers in which the amount of damping fluid flowing between the upper and lower portions of the working chamber may be controlled with a relatively high degree of accuracy and speed. A related object of the present invention is to provide an apparatus for controlling shock absorbers in which the amount of damping forces provided by the shock absorber can be adjusted with a relatively high degree of accuracy and speed.

Another object of the present invention is to provide an apparatus for controlling shock absorbers in which movement of the components of the solenoid which is used to control the damping forces is reduced. In this regard, a related object of the present invention is to provide an apparatus for controlling shock absorbers in which the plunger of a solenoid may be held in one position to produce both a firm compression stroke as well as a firm rebound stroke.

A further related object of the present invention is to provide an apparatus for controlling shock absorbers in which the plunger of a solenoid may be held in one position to produce both a soft compression stroke as well as a soft rebound stroke.

Another object of the present invention is to provide a an apparatus for controlling shock absorbers in which the flow of damping fluid through the shock absorber is unidirectional. In this regard, a related object of the present invention is to provide an apparatus for controlling shock absorbers in which a base valve limits flow of damping fluid to one direction.

A further object of the present invention is to provide an apparatus for controlling shock absorbers which is relatively inexpensive yet is able to accurately control the damping forces provided by the shock absorber.

BRIEF DESCRIPTION OF THE DRAWINGS

Other objects of the present invention will become apparent to one skilled in the art upon reading the following specification and by reference to the following drawings in which:

FIG. 7 is a block diagram illustrating the electronic control module which is used for controlling the shock absorber shown in FIG. 2;

DESCRIPTION OF THE PREFERRED EMBODIMENT

Figure 1:
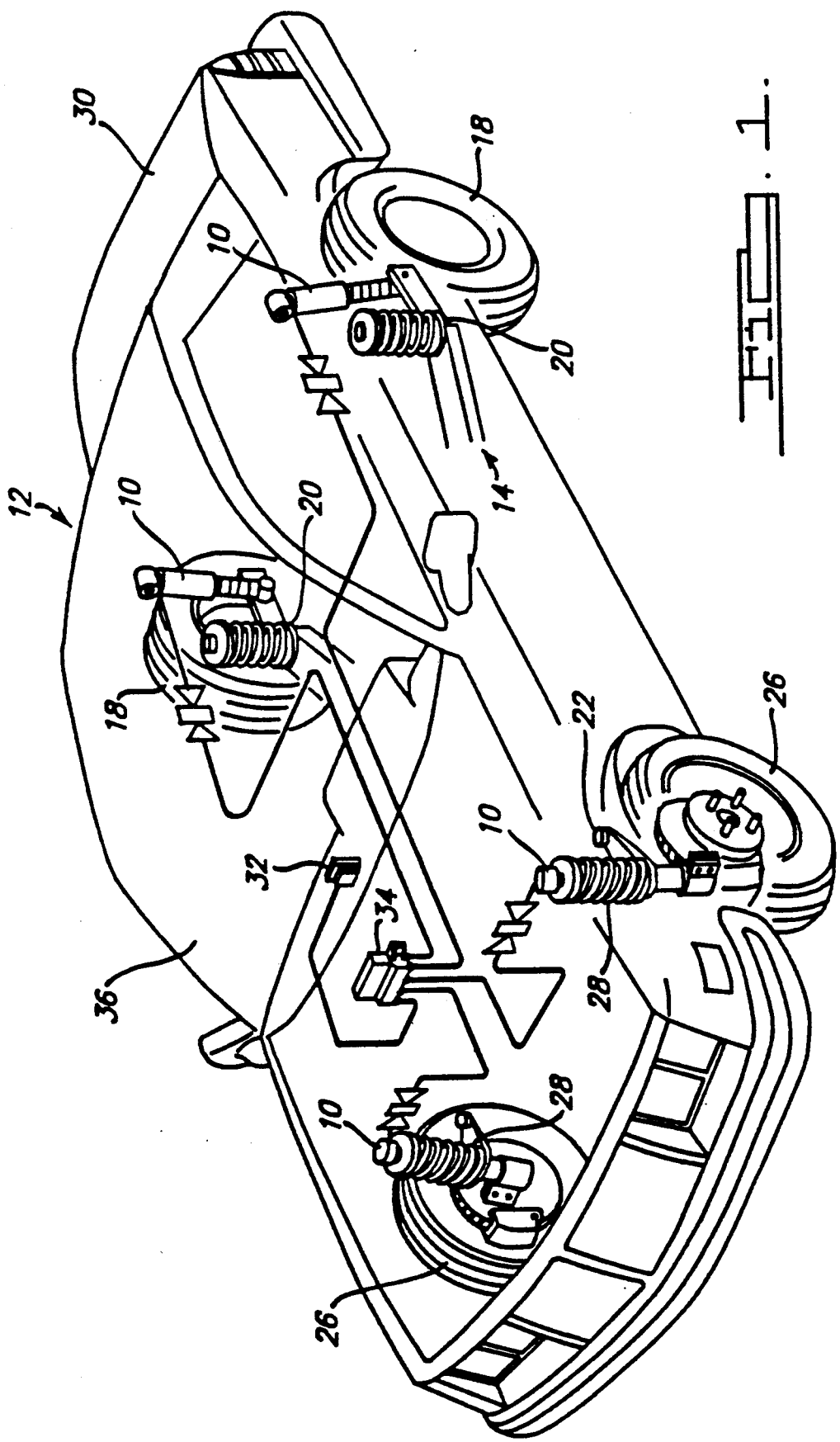
FIG. 1 is an illustration of an automobile using the method and apparatus for controlling shock absorbers according to the teachings of the preferred embodiment of the present invention.

Referring to FIG. 1, a plurality of four shock absorbers 10 according to the preferred embodiment of the present invention are shown. The shock absorbers 10 are depicted in operative association with a diagrammatic representation of a conventional automobile 12. The automobile 12 includes a rear suspension system 14 having a transversely extending rear axle assembly (not shown) adapted to operatively support the vehicle's rear wheels 18. The rear axle assembly is operatively connected to the automobile 12 by means of a pair of shock absorbers 10 as well as by the helical coil springs 20. Similarly, the automobile 12 has a front suspension system 22 including a transversely extending front axle assembly (not shown) to operatively support the front wheels 26. Front axle assembly is operatively connected to the automobile 12 by means of a second pair of shock absorbers 10 and by the helical coil springs 28. The shock absorbers 10 serve to damp the relative movement of the unsprung portion (i.e., the front and rear suspension systems 22 and 14) and the sprung portion (i.e., the body 30) of the automobile 12. while the automobile 12 has been depicted as a passenger car, the shock absorber 10 may be used with other types of automotive vehicles or in other types of applications. Further, the term "shock absorber" as used herein will refer to shock absorbers in the general sense of the phrase and will include MacPherson struts. In addition, the shock absorbers may be used with other types of suspension systems as well.

To allow the damping characteristics of the shock absorbers 10 to be controlled, a mode select switch 32 and an electronic control module 34 are provided. The mode select switch 32 is located within the passenger compartment 36 of the automobile 12 and is accessible by the occupants of the automobile 12. The mode select switch 32 is used for selecting which type of damping characteristics the shock absorbers 10 are to provide (i.e., firm, soft or automatic). The electronic control module 34 receives the output from the mode select switch 32 and is used for generating electronic control signals for controlling damping characteristics of the shock absorbers 10. By controlling the damping characteristics of the shock absorbers 10, the shock absorbers 10 are able to dampen relative movement between the body 30 and the suspension of the automobile 12 in such a manner as to optimize both ride comfort and road handling ability simultaneously.

Figure 2:
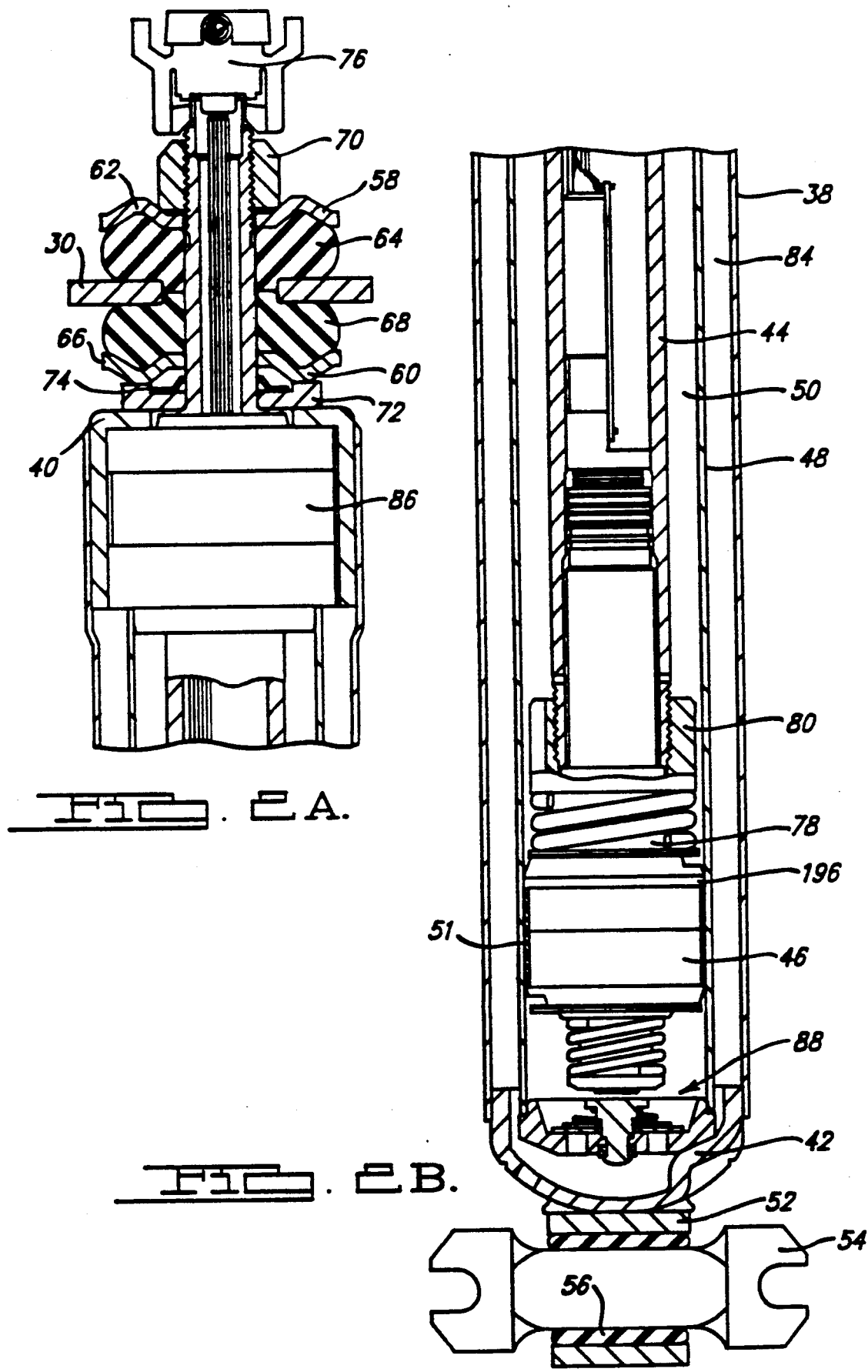
FIGS. 2A and 2B is the schematic representation of the shock absorber using the method and apparatus for controlling shock absorbers according to the teachings of the preferred embodiment of the present invention.

The structure of the shock absorbers 10 will now be described with reference to FIG. 2. The shock absorber 10 comprises an elongated reserve tube 38 which engages a cup-shaped oil cap 40 at the upper end of the reserve tube 38. The reserve tube 38 also engages a base cup 42 at the lower end of the reserve tube 38 so as to form a chamber which is able to store damping fluid. Extending axially through the oil cap 40 is a piston rod 44 which is secured to a reciprocating piston assembly 46 at the lower end of the piston rod 44. The piston assembly 46 is axially displaceable within an elongated tubular pressure cylinder 48 which is disposed within the reserve tube 38. The pressure cylinder 48 defines a working chamber 50 in which the upper portion of the working chamber 50 is located above the piston assembly 46, while the lower portion of the working chamber 50 is located below the piston assembly 46. Disposed between the piston assembly 44 and the pressure cylinder 48 is a teflon sleeve 51 which is used to facilitate movement of the piston assembly 46 with respect to pressure cylinder 48.

To connect the shock absorber 10 to the rear axle assembly of the automobile 12, the shock absorber 10 comprises a circular end fitting 52. The circular end fitting 52 is secured to the base cup 42 of the shock absorber 10 by a suitable means such as welding. Within the circular end fitting is disposed a mounting pin 54 disposed within a bushing 56 which is adapted to engage the axle assembly of the automobile 12. To connect the shock absorber 10 to the body 30 of the automobile 12, a first retainer 58 and a second retainer 60 are provided. The first retainer 58 and the second retainer 60 are disk shaped and have a central aperture operable to receive the piston rod 44. The first retainer 58 is disposed above the body 30, while the second retainer 60 is disposed below the body 30. The first retainer 58 has an upwardly facing annular indentation 62 which is able to accommodate a first disk-shaped cushion 64 which is disposed between the body 30 of the automobile 12 and the first retainer 58. Similarly, the second retainer 60 has a downwardly facing annular indentation 66 which is operable to receive a second disk-shaped cushion 68 which is disposed between the body 30 of the automobile 12 and the second retainer 60.

The shock absorber 10 further comprises a self-locking nut 70 which is disposed on the piston rod 44 immediately above the first retainer 58. The self-locking nut 70 has an internally threaded bore which is able to threadably engage the threaded upper end portion of the piston rod 44. Accordingly, by rotating the self-locking nut 70 on the upper portion of the piston rod 44, both the first retainer 58 and the first cushion 64 are displaced in a direction toward the body 30 of the automobile 12.

The second retainer 60 is positionally secured in part by means of an annular spacer 72 which is disposed immediately above the oil cap 40. The spacer 72 has a central bore which is able to receive the upper end portion of the piston rod 44. A pal nut 74 is disposed between the second retainer 60 and the spacer 72. The pal nut 74 is generally disk shaped and has a central bore which is able to receive the piston rod 44. The pal nut 74 is used to locate and secure the spacer 72.

Figure 8:
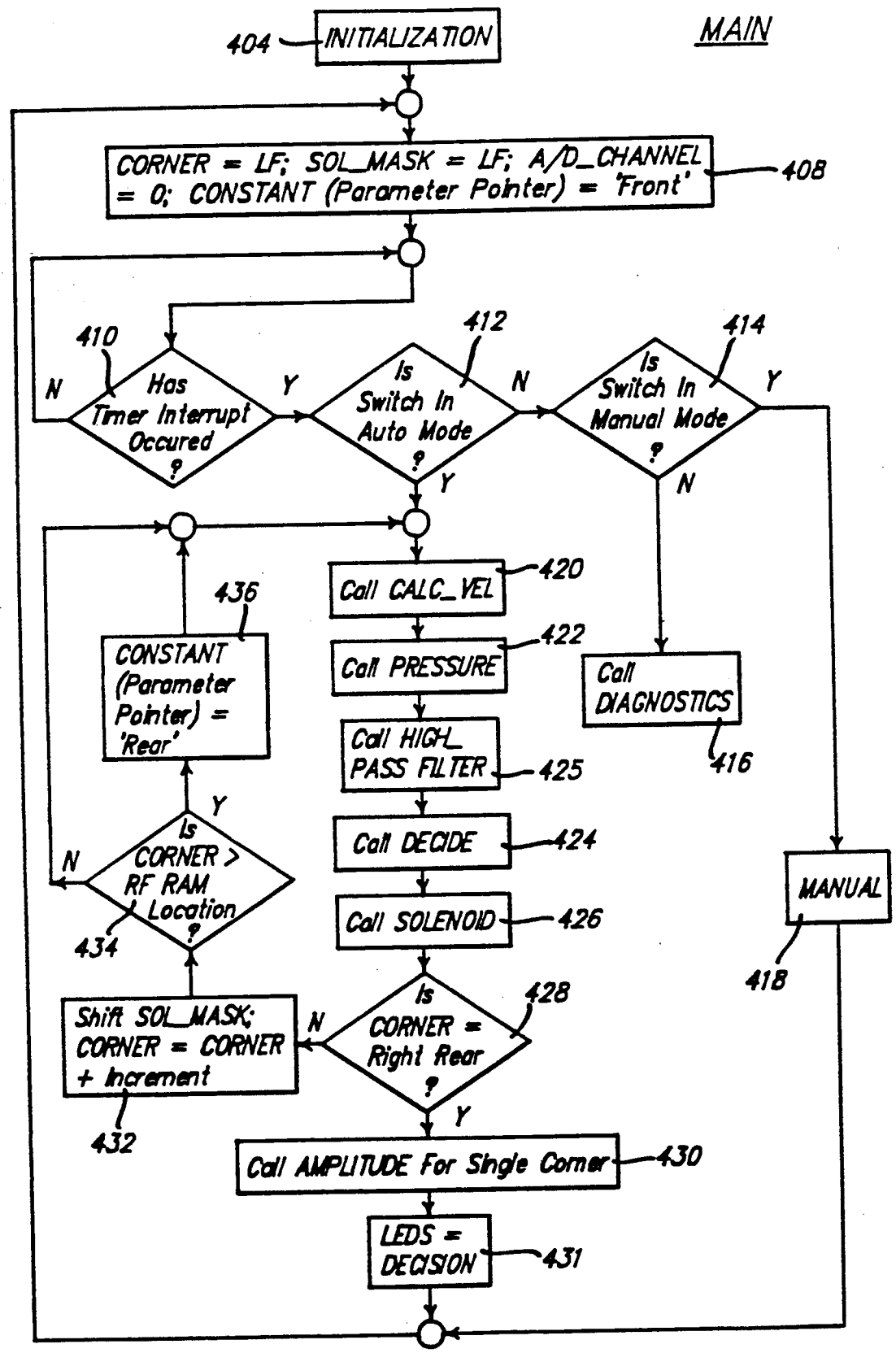
FIG. 8 is a flow chart illustrating the MAIN routine which is used by the microprocessor shown in FIG. 7 for controlling the operation of the shock absorber shown in FIG. 2.
Figure 9:
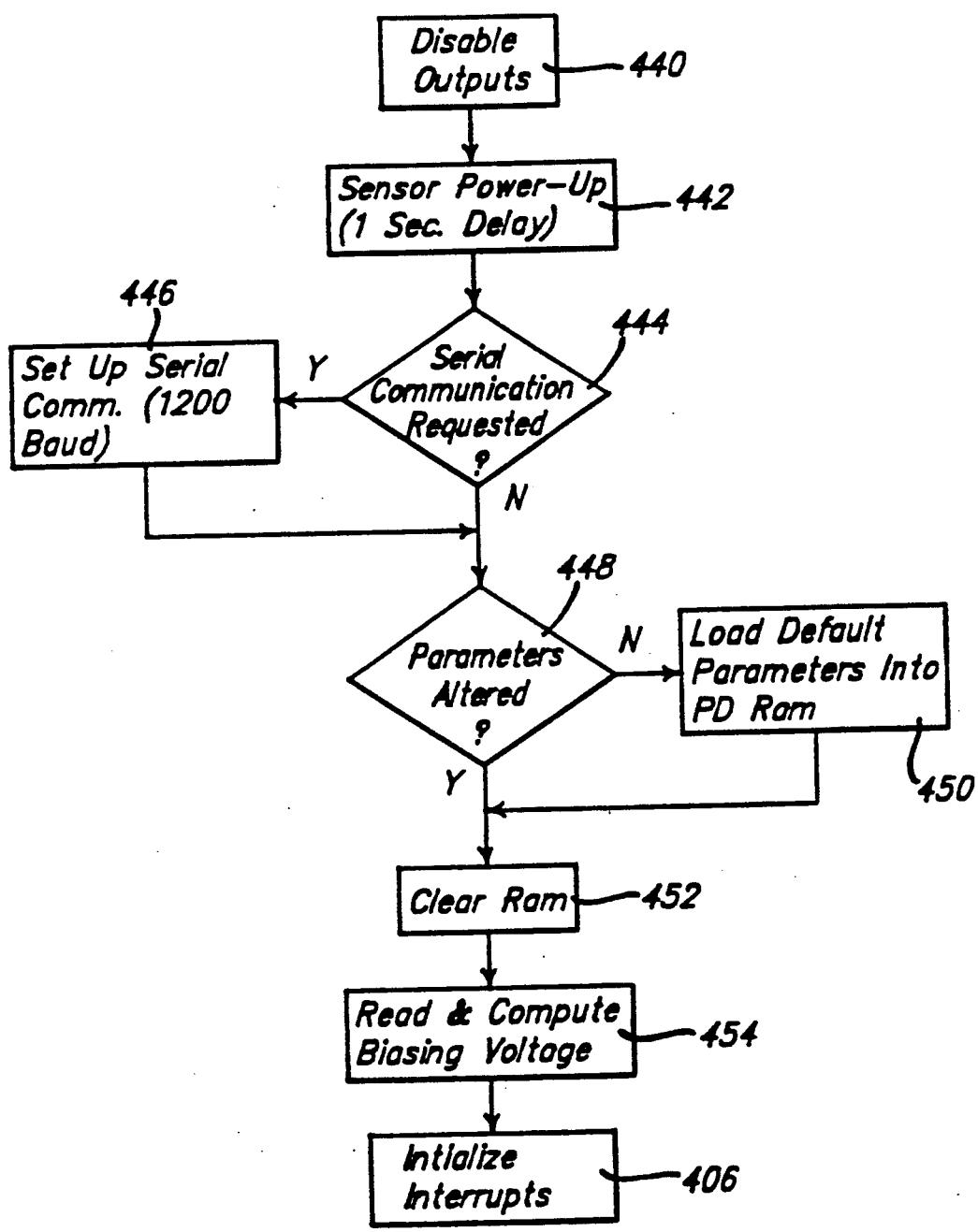
FIG. 9 is a flow chart of the INITIALIZATION portion of the MAIN routine which is used by the microprocessor shown in FIG. 8 for controlling the shock absorber shown in FIG. 2.
Figure 10:
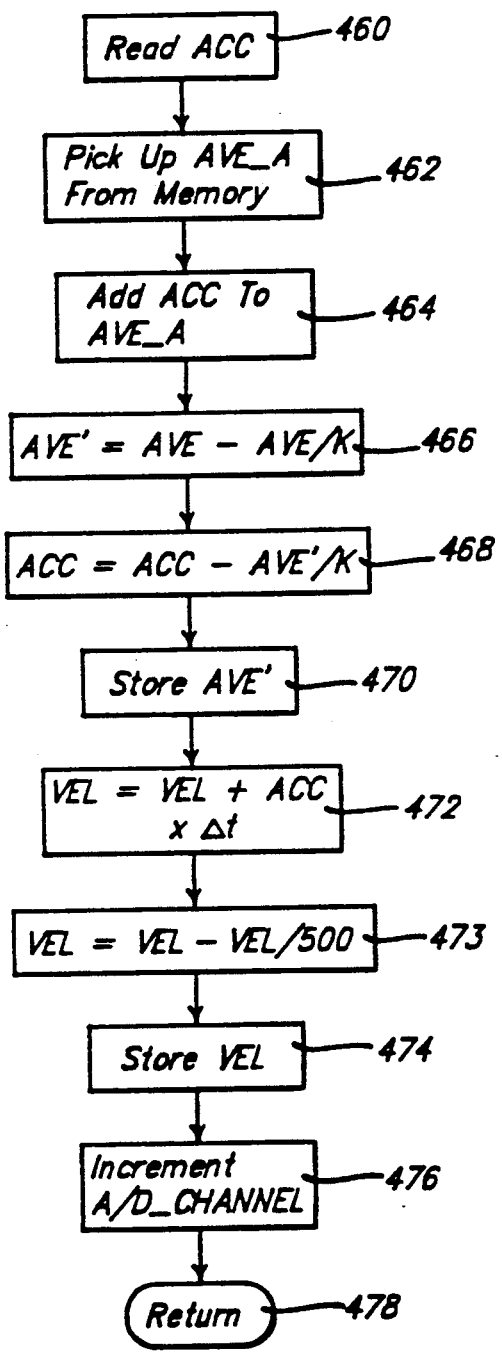
FIG. 10 is a flow chart of the CALC_VEL routine which is used by the microprocessor shown in FIG. 8 for controlling the shock absorber shown in FIG. 2.

To permit electrical communication between the electronic control module 34 and the coil described below, the shock absorber 10 further comprises an electrical connector assembly 76. The electrical connector assembly 76 allows for rapid electrical decoupling of the shock absorber 10 from the electronic control module 34 so that the shock absorber 10 may be replaced. The electrical connector assembly 76 may be of the type which is shown in FIGS. 8-10 of U.S. Ser. No. 105,404 filed on Oct. 5, 1987, though other suitable electrical connector may be used.

To support the piston assembly 46 on the piston rod 44, an axially extending piston post 78 and a piston post rod nut 80 are provided. The piston post 78 is generally circular in cross-section and extends axially through the central bore 82 (see FIG. 5) of the piston assembly 46. The piston post 78 is secured to the piston rod 44 by the piston post rod nut 80. The piston post rod nut 80 is annularly shaped and comprises an internally threaded bore which is able to mate with the externally threaded lower portion of the piston rod 44.

To support the piston rod 44 within the working chamber 50 as well as to provide unidirectional flow of damping fluid through the damping fluid reservoir 84, a rod guide/valve assembly 86 is provided. The rod guide/valve assembly 86 allows fluid flow during compression of the shock absorber 10, while preventing the flow of damping during rebound of the shock absorber 10. The rod guide/valve assembly 86 may be of the type which is shown and described in conjunction with FIG. 10 of U.S. Ser. No. 322,542, filed Mar. 13, 1989, which is hereby incorporated by reference. However, it is to be understood that other suitable rod guide/valve assemblies may be used.

Figure 3:
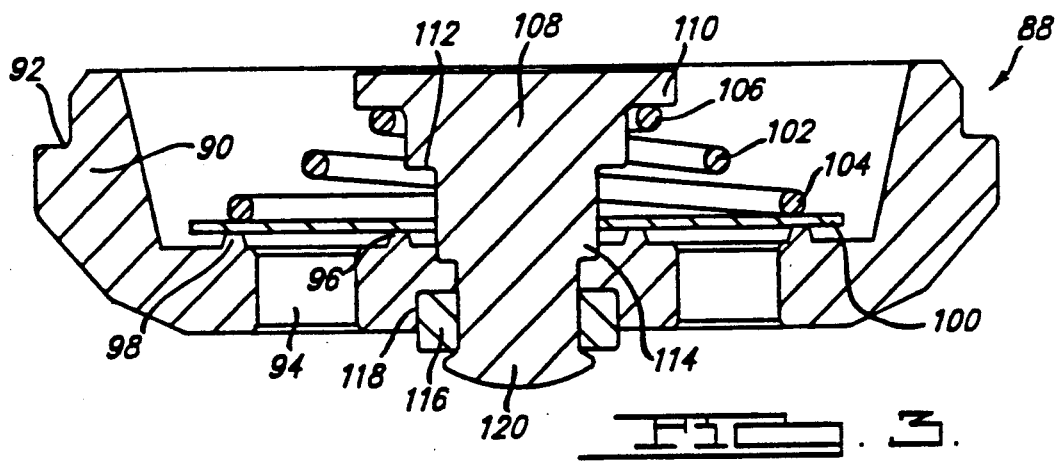
FIG. 3 is a cross-sectional view of the base valve shown in FIG. 2.

To allow damping fluid in the damping fluid reservoir 84 to flow into the working chamber 50, a base valve assembly 88 is provided as shown in FIG. 3. The base valve assembly 88 allows damping fluid to flow from the damping fluid reservoir 84 into the lower portion of the working chamber 50 during rebound. However, the base valve assembly 88 prevents the flow of damping fluid from the lower portion of the working chamber 50 to the damping fluid reservoir 84 through the base valve assembly 88 during compression. The base valve assembly 88 comprises a generally cup-shaped pressure cylinder end portion 90 which is disposed coaxially with, and adjacent to, the lower portion of the pressure cylinder 48. The end portion 90 contains a peripherally upwardly disposed recess 92 which is operable to engage the lower portion of the pressure cylinder 48. The pressure cylinder 48 is secured to the recess 92 by a suitable means such as a press fit.

The pressure cylinder end portion 90 comprises six upwardly disposed flow passages 94 which permit damping fluid to flow through the pressure cylinder end portion 90. The base valve assembly 88 further comprises first and second upwardly disposed annular projections 96 and 98 which are disposed on the upper surface of the pressure cylinder end portion 90. The upwardly disposed annular projection 96 extends coaxially with the axial center line of the pressure cylinder end portion 90 and resides adjacent to the radially inwardmost edge of the flow passages 94. Similarly, the upwardly disposed annular projection 98 extends coaxially with respect to the axial center line of the pressure cylinder end portion 90 and is adjacent to the radially outwardmost edge of the flow passages 94.

The flow of damping fluid through the flow passages 94 is regulated by an intake disk 100. The intake disk 100 is located perpendicular to the axial center line of the pressure cylinder end portion 90. Furthermore, the intake disk 100 rests on the upwardly disposed annular projections 96 and 98 when no damping fluid is flowing through the flow passages 94. Accordingly, the intake disk 100 is able to prevent the flow of damping fluid through the flow passages 94 while the intake disk 100 rests on the upwardly disposed annular projections 96 and 98.

To bias the intake disk 100 against the upwardly disposed annular projections 96 and 98, the base valve assembly 88 also comprises a tapered helical intake spring 102. The intake spring 102 is disposed coaxially with the axial center line of the pressure cylinder end portion 90, with the lower portion 104 of the intake spring 102 resting against the upper surface of the intake disk 100. The diameter of the lower portion 104 of the intake spring 102 is larger than the diameter of the upper portion 106 of the intake spring 102 so that the lower portion 104 of the intake spring 102 extends proximate to the radially outwardmost periphery of the intake disk 100. Because the lower portion 104 of the intake spring 102 biases the intake disk 100 against the upwardly disposed annular projections 96 and 98, damping fluid is able to flow through the flow passages 94 only when the force exerted by the damping fluid in the flow passages 94 is large enough to overcome the biasing force provided by the intake spring 102.

To secure the upper end of the intake spring 102 within the base valve assembly 88, the base valve assembly 88 further comprises a base valve pin 108. The base valve pin 108 extends through and is disposed coaxially with the axial center line of the pressure cylinder end portion 90. The base valve pin 108 also extends through a central aperture in the intake disk 100 so that the base valve pin 108 can prevent lateral movement of the intake disk 100. The upper portion of the base valve pin 108 includes a first flange portion 110 which extends perpendicularly with respect to the axial center line of the base valve pin 108. The upper surface of the intake spring 102 rests on the lower surface of the first flange portion 110 so as to secure the intake spring 102 within the base valve assembly 88.

The base valve pin 108 further comprises a second flange portion 112 and a third flange portion 114. Because the second flange portion 112 extends a greater radial distance than the central aperture of the intake disk 100 through which the base valve pin 108 extends, the flange portion 112 may limit upward movement of the intake disk 100. The third flange portion 114 extends a greater radial distance than the aperture of the pressure cylinder end portion 90 through which the base valve pin 108 extends. Accordingly, the third flange portion 114 limits downward movement of the base valve pin 108 with respect to the pressure cylinder end portion 90.

Upward movement of the base valve pin 108 is limited by an annular base valve insert 116 which is disposed within a central annular recess 118 on the lower surface of the pressure cylinder end portion 90. The base valve insert 116 is disposed coaxially with the axial center line of the base valve pin 108 and is disposed on the radial periphery of the base valve pin 108. Because the lower portion of the base valve pin 108 has a deformed head portion 120 having a greater radial diameter than the internal diameter of the base valve insert 116, the base valve insert 116 prevents upward movement of the base valve pin 108 with respect to the pressure cylinder end portion 90.

Figure 4A:
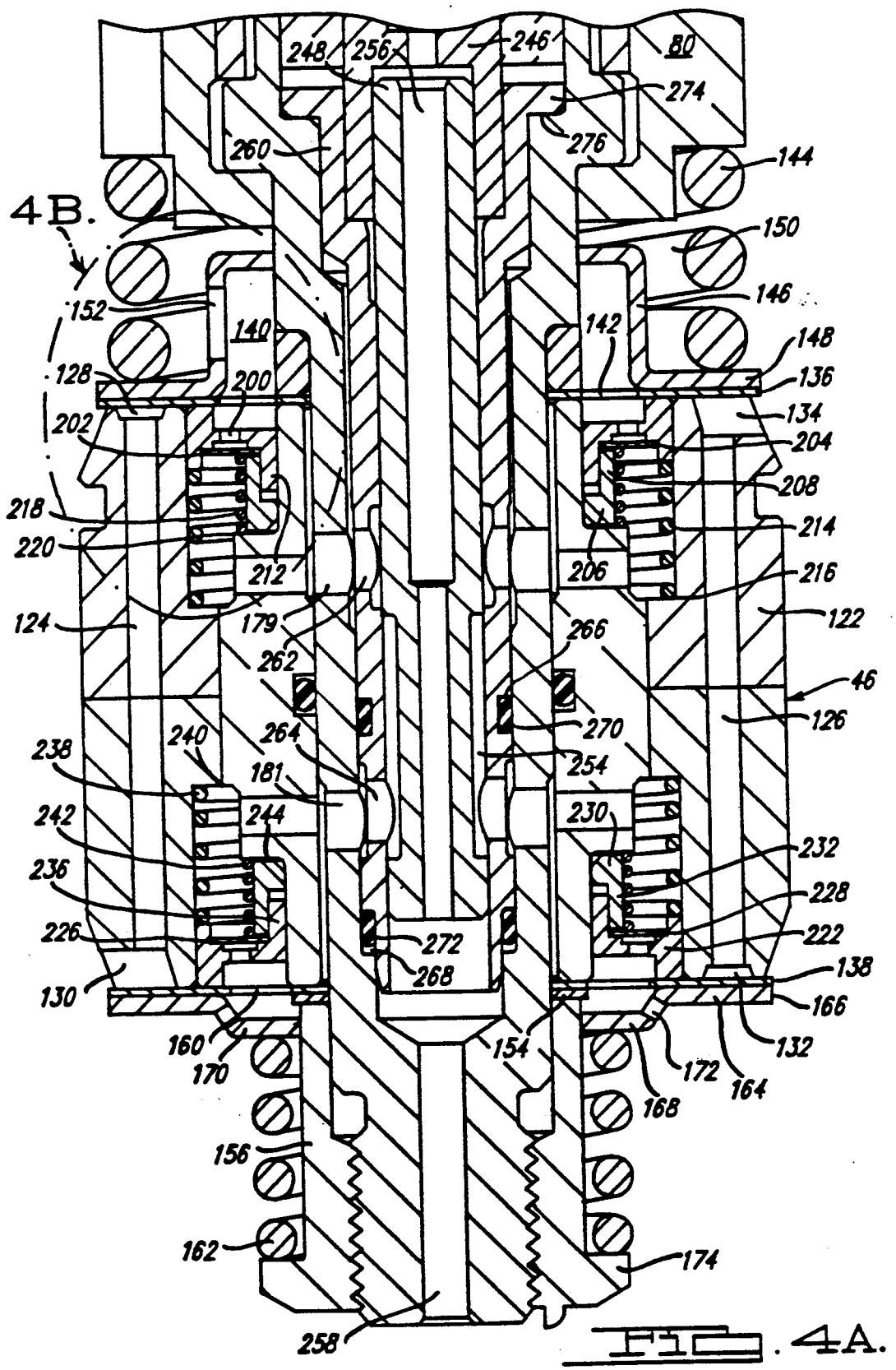
FIGS. 4A, 4B and 4C are cross-sectional views of the piston assembly and the lower portion of the piston post shown in FIG. 2.

The piston assembly 46 will now be described in greater detail with reference to FIGS. 4A, 4B and 4C. The piston assembly 46 is used for controlling the flow of damping fluid between the upper and lower portions of the working chamber 50. The piston assembly 46 comprises a valve body 122 having a first and second plurality of vertical flow passages 124 and 126. Each of the flow passages 124 comprises a valve controlled upper outlet end portion 128 and a lower counter-recessed inlet end portion 130. Similarly, each of the flow passages 126 comprise a valve controlled lower outlet end portion 132 and an upper counter-recessed inlet end portion 134.

To allow the piston assembly 46 to regulate the flow of damping fluid between the upper and lower portions of the working chamber 50, an upper spring disk 136 and a lower spring disk 138 are provided. The upper spring disk 136 is disposed adjacent to the upper outlet end portion 128 of the flow passages 124, as well as the upper inlet end portion 134 of the flow passages 126. In addition, the upper surface of the spring disk 136 is adjacent to an annular spacer 140 which is coaxially disposed on the periphery of the piston post 78. Accordingly, the spacer 140 and the piston assembly 46 prevent movement of the radially inward portion of the upper spring disk 136. The upper spring disk 136 further has a flow passage 142 which allows damping fluid to flow therethrough which is used to bias the spring disks 136 and 138 in a manner described below.

To place a biasing force on the upper surface of the upper spring disk 136, a first helical valve spring 144 and a annularly shaped spring seat 146 are provided. The spring seat 146 has a radially extending portion 148 as well as an axially extending portion 150. The radially extending portion 148 is disposed adjacent to the upper surface of the upper spring disk 136 and extends from the outer radial surface of the flow passage 142 to the radially outer edge of the upper spring disk 136. The axially extending portion 150 of the spring seat 146 extends from the radially extending portion 148 in an axially direction to a position immediately below the piston post rod nut 80. The axially extending portion 150 further comprises a flow passage 152 which allows damping fluid in the upper portion of the working chamber 50 to flow therethrough so as to provide the necessary biasing forces in the manner described below.

The helical valve spring 144 is disposed between the piston post rod nut 80 and the upper surface of the radially extending portion 148 of the spring seat 146. Since the valve spring 144 is in compression, the valve spring 144 forces the radially extending portion 148 of the spring seat 146 against the upper surface of the spring disk 136, which in turn forces the lower surface of the spring disk 136 against the upper outlet end portion 128 of the vertical flow passages 124.

The lower spring disk 138 is disposed adjacent to the lower surface of the piston assembly 46 adjacent to the lower outlet end portion 132 of the vertical flow passages 126 as well as the lower inlet end portion 130 of the vertical flow passages 124. The lower spring disk 138 is upwardly secured by the upper surface of the valve body 122, and is downwardly secured by a disk-shaped spacer 154 which is disposed coaxially above a piston nut 156 which threadably engages the externally threaded lower end portion of the piston post 78. Accordingly, the inner radial periphery of the lower spring disk 138 is secured between the spacer 154 and the valve body 122 by the piston nut 156. The lower spring disk 138 comprises a flow passage 160 which allows damping fluid in the lower portion of the working chamber 50 to flow therethrough. As will be described more thoroughly below, damping fluid flowing through the flow passage 160 is used for varying the biasing force applied to the upper spring disk 136 and thus the valve spring 144.

To provide biasing forces on the outer periphery of the lower spring disk 138, a second valve spring 162 and a spring seat 164 are provided. The spring seat 164 comprises a first radially extending portion 166 as well as a second radially extending portion 168. The first radially extending portion 166 is disposed coaxially above the second radially extending portion 168 and is connected thereto by the step portion 170. The step portion 170 further has a flow passage 172 which allows damping fluid to flow therethrough in a manner described below.

The second valve spring 162 is disposed adjacent to the outer periphery of the upper portion of the piston nut 156 with the upper surface of the valve spring 162 resting on the lower surface of the second radially extending portion 168 of the spring seat 164. The lower surface of the valve spring 162 rests on the upper surface of a radially extending flange portion 174 of the piston post 78. Because the valve spring 162 is in compression, the valve spring 162 places an upward biasing force on the spring seat 164 which places an upwardly directed biasing force on the lower spring disk 138. Accordingly, the lower spring disk 138 is able to limit the flow of damping fluid flowing through the flow passages 126 during rebound.

Figure 5:
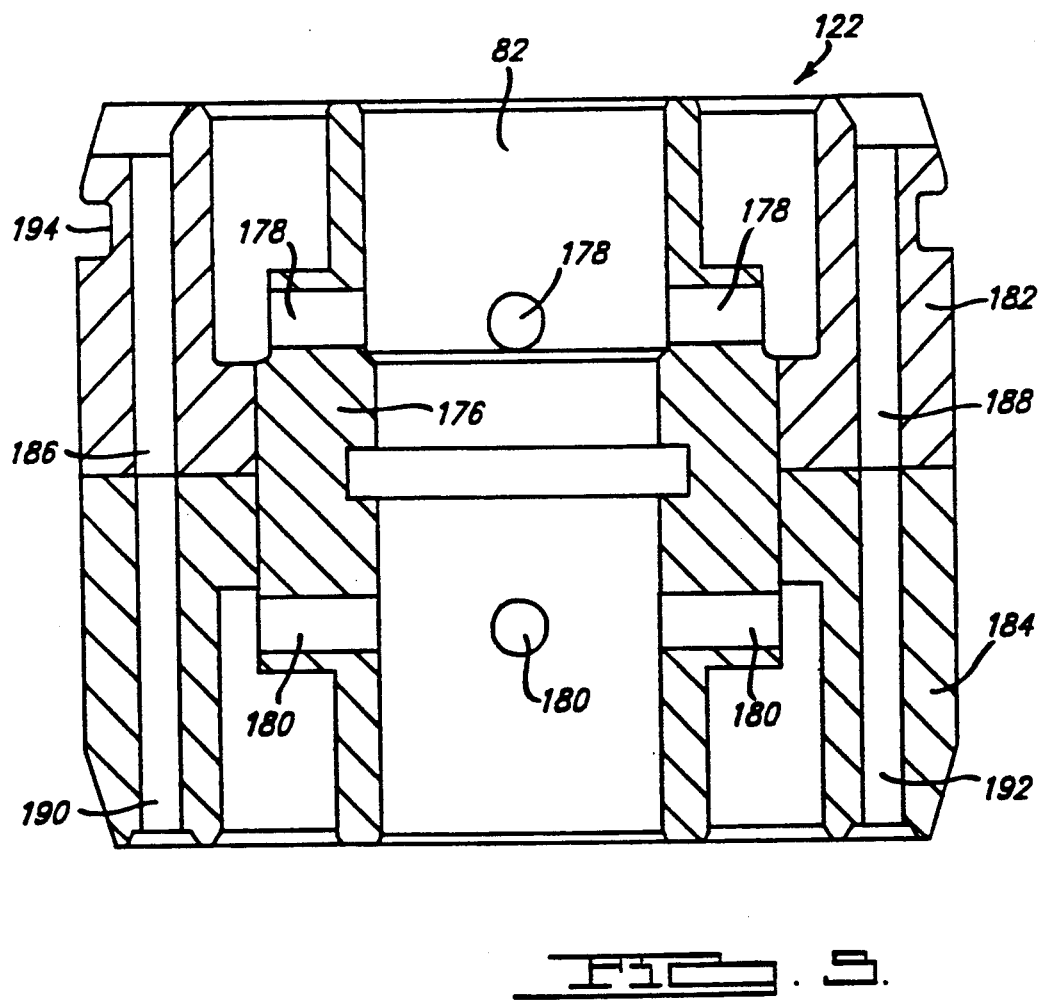
FIG. 5 is a cross-sectional view of the inner piston subassembly as well as the first and second outer piston subassemblies shown in FIG. 2.

The valve body 122 comprises an annular inner piston subassembly 176 as shown in FIG. 5. The annular inner piston subassembly 176 is disposed coaxially with the axial center line of the piston post 78, and is disposed on the outer radial periphery of the piston post 78 between the upper spring disk 136 and the lower spring disk 138. The inner piston subassembly 176 comprises a first plurality of flow passages 178 as well as a second plurality of flow passages 180. The first and second plurality of flow passages 178 and 180 radially extend from the axial center line of the inner piston subassembly 176. In addition, the center lines of the first plurality of flow passages 178 lie in a plane which is perpendicular to the axial center line of the inner piston subassembly 176. The center lines of the second plurality of flow passages 180 also reside in a plane which is perpendicular to the axial center line of the inner piston subassembly 176, though the flow passages 180 are displaced axially downward from the flow passages 178. The flow passages 178 fluidly communicate with a plurality of radially extending flow passages 179 which are disposed in the piston post 78, while the flow passages 180 communicate with a plurality of flow passages 181 also disposed in the piston post 78. The axial center lines of the flow passages 178 are colinear with the axial center lines of the flow passages 179, while the axial center lines of the flow passages 180 are colinear with the axial center lines of the flow passages 181.

The valve body 122 also comprises a first outer annular piston subassembly 182 and a second outer annular piston subassembly 184. The first and second outer annular piston subassemblies 182 and 184 are disposed on the radial outer peripheral edge of the inner piston subassembly 176 at a position proximate to the plane perpendicular to the axial center line of the piston assembly 46 dividing the inner piston subassembly 176 into similar portions. The first outer annular piston subassembly 182 comprises a plurality of flow passages 186 and 188 which extend coaxially with the axial center line of the piston post 78. In addition, the second outer annular piston subassembly 184 comprises a plurality of flow passages 190 and 192 which also extend coaxially with the axial center line of the piston post 78. Because the flow passages 186 of the first outer annular piston subassembly 182 are coaxial with the flow passages 190 of the second outer annular piston subassembly 184, the flow passages 186 and 190 form the vertical flow passages 124 as shown in FIG. 4A. Similarly, the flow passages 188 of the first outer annular piston subassembly 182 are coaxial with the flow passages 192 of the second outer annular piston subassembly 184 so as to form the flow passages 126 also shown in FIG. 4A.

The first outer annular piston subassembly 182 further comprises an annular groove 194 disposed on the radially outer surface of the subassembly 182. The annular groove 194 is of sufficient depth to secure the seal 196 (see FIG. 2B) disposed between the pressure cylinder 48 and the first outer annular piston subassembly 182. The annular inner piston subassembly 176, the first outer annular piston subassembly 182, as well as the second outer annular piston subassembly 184 may be rigidly secured to each after formation of the flow passages 178 and 180 by copper infiltration. Accordingly, difficulties otherwise encountered in forming the flow passages 178 and 180 if the subassemblies 176, 182 and 184 were initially an integral unit are reduced.

Figure 4B:
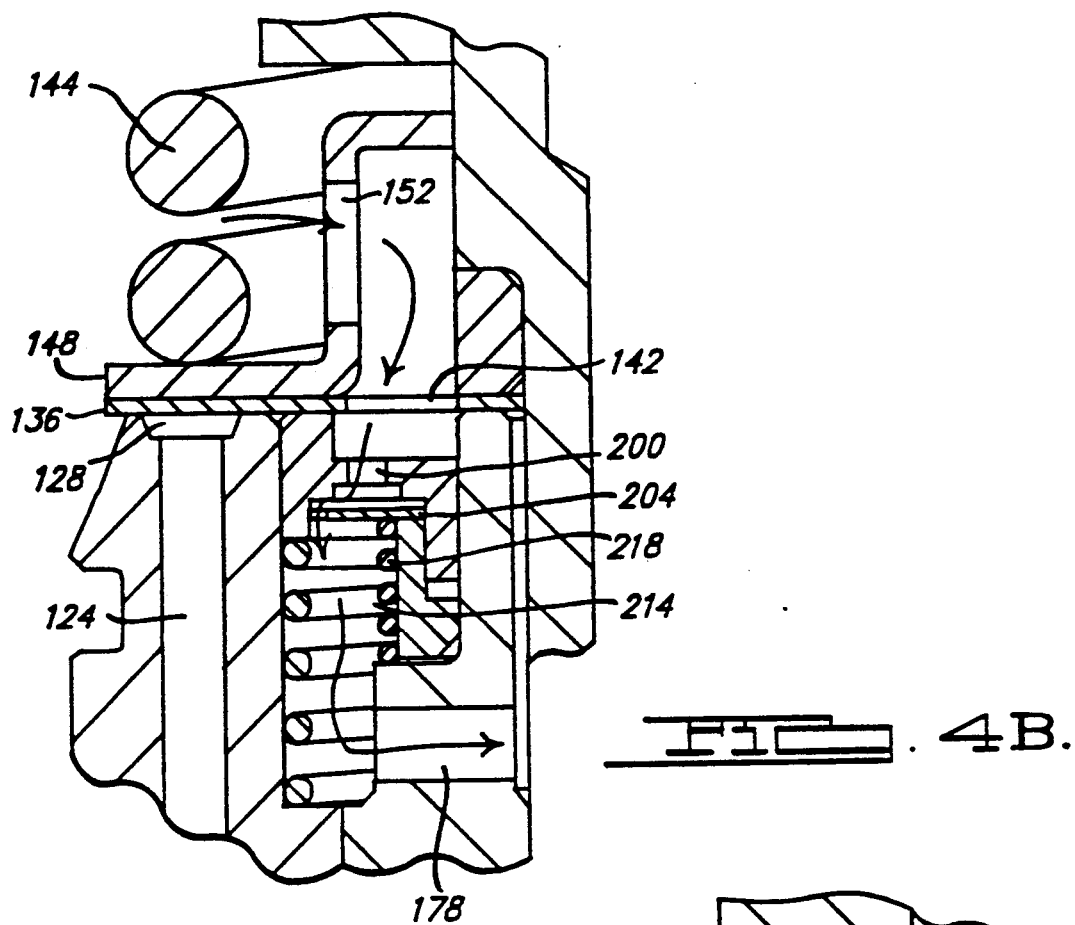
Figure 4C:
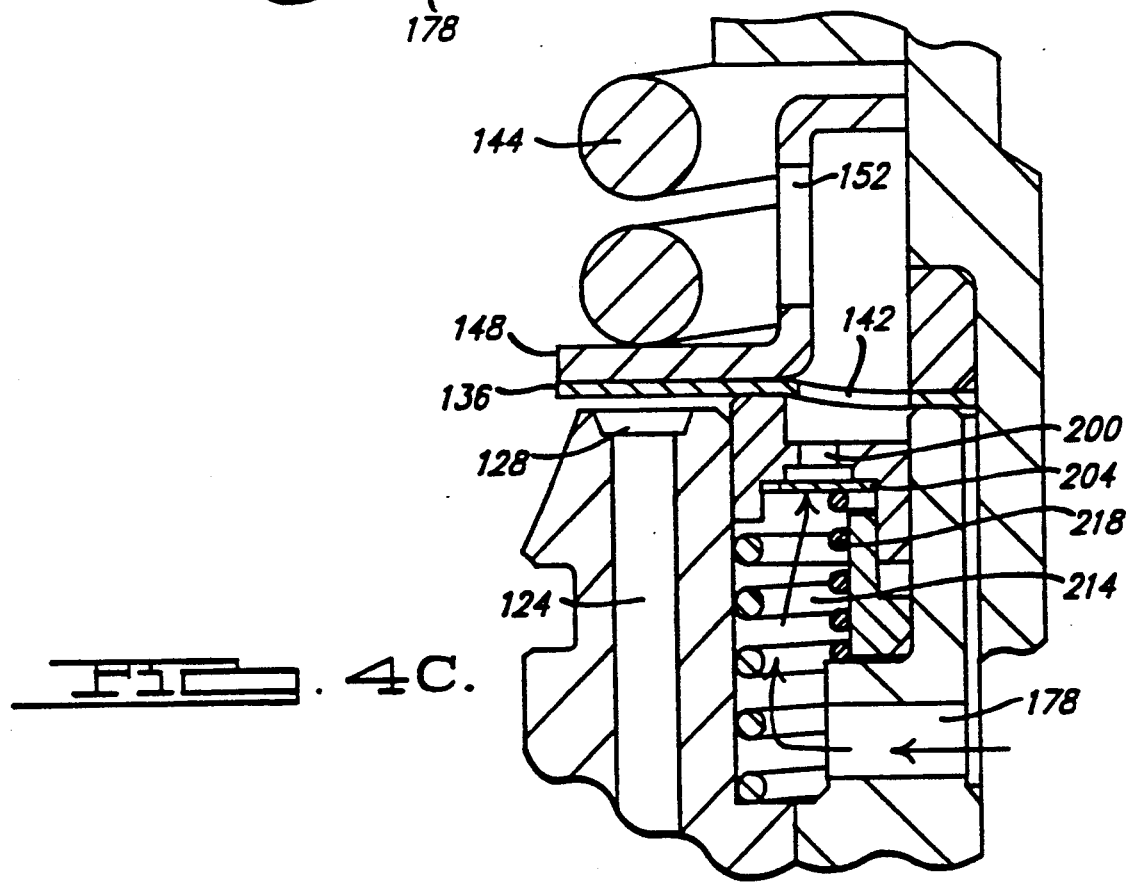

To vary the biasing force applied to the upper spring disk 136, an upper outer annular unloader 198 is provided (see FIGS. 4B and 4C). The radially inward surface of the upper outer unloader 198 is disposed on the radially outer surface of the upper portion of the inner piston subassembly 176. The radially outer surface of the upper outer unloader 198 mechanically communicates with the lower surface of the upper spring disk 136, and has a radially extended surface which mechanically communicates with the radially inner surface of the first outer annular piston subassembly 182. The central portion of the upper outer unloader 198 includes a flow passage 200 as well as a valve seat 202. The valve seat 202 is used to prevent upward movement of a valve disk 204 which is used to limit the flow of damping fluid through the flow passage 200 in a manner described below.

To positionally secure the inner periphery of the valve disk 204, an upper inner unloader 206 is provided. The upper inner unloader 206 is disposed on the outer radial periphery of the upper portion of the inner piston subassembly 176. The upper inner unloader 206 comprises an axially extending portion 208 having a radially inward surface which is disposed adjacent to a radially outward surface of a downwardly extending projection 212 of the upper outer unloader 198. Furthermore, the upper inner unloader 206 is disposed so that the upwardmost surface of the upper inner unloader 206 is proximate to a radially inwardmost portion of the valve disk 204 thereby securing the valve disk 204 between the upper outer unloader 198 and the upper inner unloader 206.

To bias the upper outer unloader 198 against the upper spring disk 136, a helical coil spring 214 is provided. The helical coil spring 214 is disposed coaxially between the lower surface of the radially outwardmost portion of the upper outer unloader 198 and a step portion 216 in the first outer piston subassembly 182. Because the spring 214 is in compression, the spring 214 biases the upper outer unloader 198 against the lower surface of the upper spring disk 136. In addition, to bias the valve disk 204 against the valve seat 202, a helical spring 218 is provided. The spring 218 is disposed coaxially with the axial center line of the piston post 78 adjacent to the upper inner unloader 206. Upward movement of the spring 218 is limited by the valve seat 202, while downward movement of the spring 218 is limited by a step 220 which is disposed on the outer surface of the inner piston subassembly 176. The spring 218 is used to bias the valve disk 204 against the valve seat 202.

To vary the biasing force applied to the lower spring disk 138, a lower outer annular unloader 222 is provided. The radially inward surface of the lower outer unloader 222 is disposed on the radially outer surface of the lower portion of the inner piston subassembly 176. The radially outer portion of the lower outer unloader 222 has an upper surface which mechanically communicates with the upper surface of the lower spring disk 138, and has a radially extended surface which mechanically communicates with the second outer annular piston subassembly 184. The central portion of the lower outer unloader 222 includes a flow passage 224 as well as a valve seat 226. The valve seat 226 is used to prevent downward movement of a valve disk 228 which is used to limit the flow of damping fluid through the flow passage 224 in a manner described below.

To positionally secure the inner periphery of the valve disk 228, a lower inner unloader 230 is provided. The lower inner unloader 230 is disposed on the outer radial periphery of the lower portion of the inner piston subassembly 176. The lower inner unloader 230 comprises an axially extending portion 232 having a radially inward surface which is disposed adjacent to a radially outward surface of a upwardly extending projection 236 of the lower outer unloader 222. Furthermore, the lower inner unloader 230 is disposed so that the lowermost surface of the lower inner unloader 230 is proximate to a radially inwardmost portion of the valve disk 228 thereby securing the valve disk 228 between the lower outer unloader 222 and the lower inner unloader 230.

To bias the lower outer unloader 222 against the lower spring disk 138, a helical coil spring 238 is provided. The helical coil spring 238 is disposed coaxially between the upper surface of the radially outwardmost portion of the lower outer unloader 222 and a step portion 240 in the second outer piston subassembly 184. Because the spring 238 is in compression, the spring 238 biases the lower outer unloader 222 against the lower spring disk 138. In addition, to bias the valve disk 228 against the valve seat 226, a helical spring 242 is provided. The spring 242 is disposed coaxially with the axial center line of the piston post 78 adjacent to the lower inner unloader 230. Upward movement of the spring 242 is limited by the valve seat 226, while downward movement of the spring 242 is limited by a step 244 which is disposed on the outer surface of the inner piston subassembly 176. The spring 242 is used to bias the valve disk 228 against the valve seat 226.

To control the flow of damping fluid between the first plurality of flow passages 178 and the second plurality of flow passages 180 in the inner piston subassembly 176, an annular upper plunger member 246 and an annular lower plunger member 248 are provided. The upper plunger member 246 is annular in shape and is disposed coaxially within the piston post 78. Disposed between the upper and lower surfaces of the upward plunger member 246 is a radially inwardly disposed step portion 250 which is used to seat a spring described below which bias the upper plunger member 246 in a downward direction. In addition, the upper plunger member 246 further comprises a pressure passage 252 which is axially disposed on the center line of the upper plunger member 246 and allows damping fluid to fluidly communicate therethrough. The lower portion of the upper plunger member 246 is secured to the upper portion of the lower plunger member 248 by a suitable means such as by welding.

The lower plunger member 248 is disposed coaxially within the piston post 78 and is cylindrical in cross-section. The lower plunger member 248 includes a region 254 located at the lower end of the lower plunger member 248 which has a reduced external radius. The region is used to allow damping fluid to flow between the flow passages 178 and 180 in the manner described below. In addition, the lower plunger member 248 includes a pressure passage 256 which allows damping fluid in the lower portion of the working chamber 50 to fluidly communicate with the pressure passage 252 of the upper plunger member 246 through the pressure passage 258 located at the lower end of the piston post 78.

To house the lower plunger member 248, a plunger housing 260 is provided. The plunger housing 260 is disposed on the inner periphery of the piston post 78 and extends coaxially therewith. The plunger housing 260 comprises a plurality of upper flow passages 262 and a plurality of lower flow passages 264. The upper flow passages 262 fluidly communicate with the flow passages 178 in the inner piston subassembly 176, as well as the flow passages 179 in the piston post 78. In addition, the lower flow passages 264 in the plunger housing 260 fluidly communicate with the second plurality of flow passages 180 in the inner piston subassembly 176, as well as the flow passages 181 in the piston post 78. Furthermore, the upper flow passages 262 are able to fluidly communicate with the lower flow passages 264 when the lower plunger member 248 is displaced sufficiently in an upward direction so that the region 254 of the lower plunger member 248 having a reduced external diameter is proximate to both the upper flow passages 262 and the lower flow passages 264.

The plunger housing 260 further comprises an upper annular groove 266 and a lower annular groove 268. Both the grooves 266 and 268 are disposed around the radial outer periphery of the plunger housing 260 adjacent to the piston post 78. The groove 266 is disposed between the upper flow passages 262 and the lower flow passages 264 in the plunger housing 260, while groove 268 is disposed between the lower flow passage 264 and the lowermost portion of the plunger housing 260. Disposed within the groove 266 is an annular seal 270 which prevents damping fluid from flowing between the plunger housing 260 and the piston post 78. Further, an annular seal 272 is disposed in the groove 268 which also prevents damping fluid from flowing between the plunger housing 260 and the piston post 78.

To limit downward movement of the plunger housing 260, the plunger housing 260 has a radial extending flange 274 disposed at the upper portion thereof. The flange 274 rests on a radially extending step portion 276 of the piston post 78. Because the internal diameter of the piston post 78 in the region proximate to the step portion 276 is less than the diameter of the radially outwardmost surface of the flange 274, the step portion 276 prevents the flange 274 and hence the plunger housing 260 from being displaced in a downward direction. Upward movement of the plunger housing 260 is limited by an annular spacer 278 which is disposed adjacent to the upper surface of the flange 274 of the plunger housing 260. The spacer 278 is disposed adjacent to the radially outward surface of the upper plunger member 246 and is also adjacent to the radially inwardmost surface of the piston post 78.

To cause movement of the lower plunger member 248 within the plunger housing 260, an annular coil 286 is provided. The annular coil 286 is disposed on the inner periphery of the piston post 78 at a position above the spacer 278. The coil 286 is formed around an annular coil sleeve 288 which resides on the inner periphery of the coil 286 and is located approximate to the radially outer surface of the upper plunger member 246. In addition, the annular coil 286 comprises a pressure passage 289 disposed axially through the sleeve 288 which permits damping fluid to fluidly communicate between the lower portion of the working chamber 50 and the pressure sensor described below.

As those skilled in the art will recognize, the upper plunger member 246, the lower plunger 248 and the coil 286 form a solenoid. The application of current to the coil 286 will cause the upper plunger member 246 to be upwardly displaced thereby causing the region 254 of the lower plunger member 248 to be proximate to the upper flow passages 262, as well as the lower flow passages 264. When this occurs, damping fluid is able to flow from the upper portion of the working chamber 50 to the area immediately above the lower outer unloader 222 during rebound through the following path passages: the flow passage 152, the flow passage 142, the flow passage 200, the flow passage 178, the flow passage 179, the flow passage 262, the flow passage formed between the region 254 and the plunger housing 260, the flow passage 264, the flow passage 181, and the flow passage 180. When this occurs, the increased pressure caused by fluid flowing through these flow passages causes the biasing forces exerted on the lower outer unloader 222 to increase, thereby causing the lower outer unloader 222 and hence the lower spring disk 138 to be displaced in a downward direction. More damping fluid is therefore able to flow through the flow passages 126 thereby decreasing the damping forces which the piston assembly 46 generates so as to provide a soft rebound stroke.

When the piston assembly 46 is in compression, damping fluid is able to flow through the following flow passages from the lower portion of the working chamber 50 to the region immediately below the upper outer unloader 198: the flow passage 172, the flow passage 160, the flow passage 224, the flow passage 180, the flow passage 181, the flow passage formed between the region 254 and the plunger housing 260, the flow passage 262, the flow passage 179, and the flow passage 178. When this occurs, the increased pressure caused by the fluid flowing through these flow passages cause the biasing forces exerted on the upper outer unloader 198 to increase (see FIG. 4C), thereby increasing the biasing force exerted on the upper spring disk 136 in an upward direction. Accordingly, a greater amount of damping fluid is able to flow through the flow passages 124 to thereby cause a soft compression stroke.

When the lower plunger member 248 is displaced downward in such a manner that the region 254 is not proximate to the flow passages 262 and 264, damping fluid is unable to flow between the upper portion of the working chamber 50 to the area above the lower outer unloader 222 during rebound, nor is able to flow from the lower portion of the working chamber 50 to the area immediately below the upper outer unloader 198 during compression. Accordingly, the only biasing forces exerted on the upper spring disk 136 is that which is exerted primarily by the spring 144 as the forces exerted by the springs 214 and 218 are negligible. Similarly, the only biasing force acting on the lower spring disk 138 is that which is generated primarily by the spring 162 as the forces exerted by the springs 238 and 242 are negligible. Accordingly, a firm rebound and compression stroke will be generated.

Figure 6A:
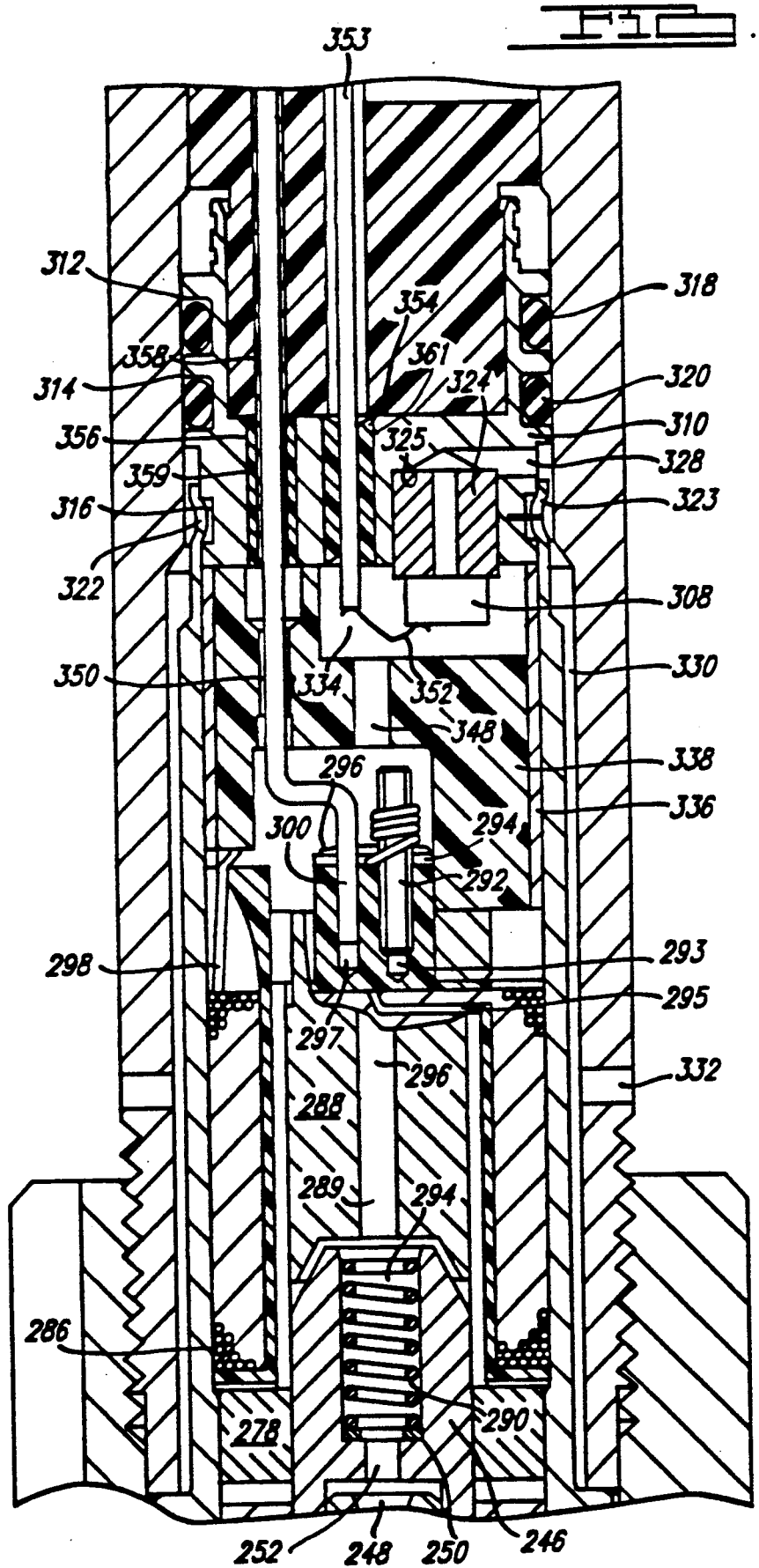
FIGS. 6A and 6B is a cross-sectional view of a portion of the piston rod shown in FIG. 2 taken in the region immediately above the piston nut.
Figure 6B:
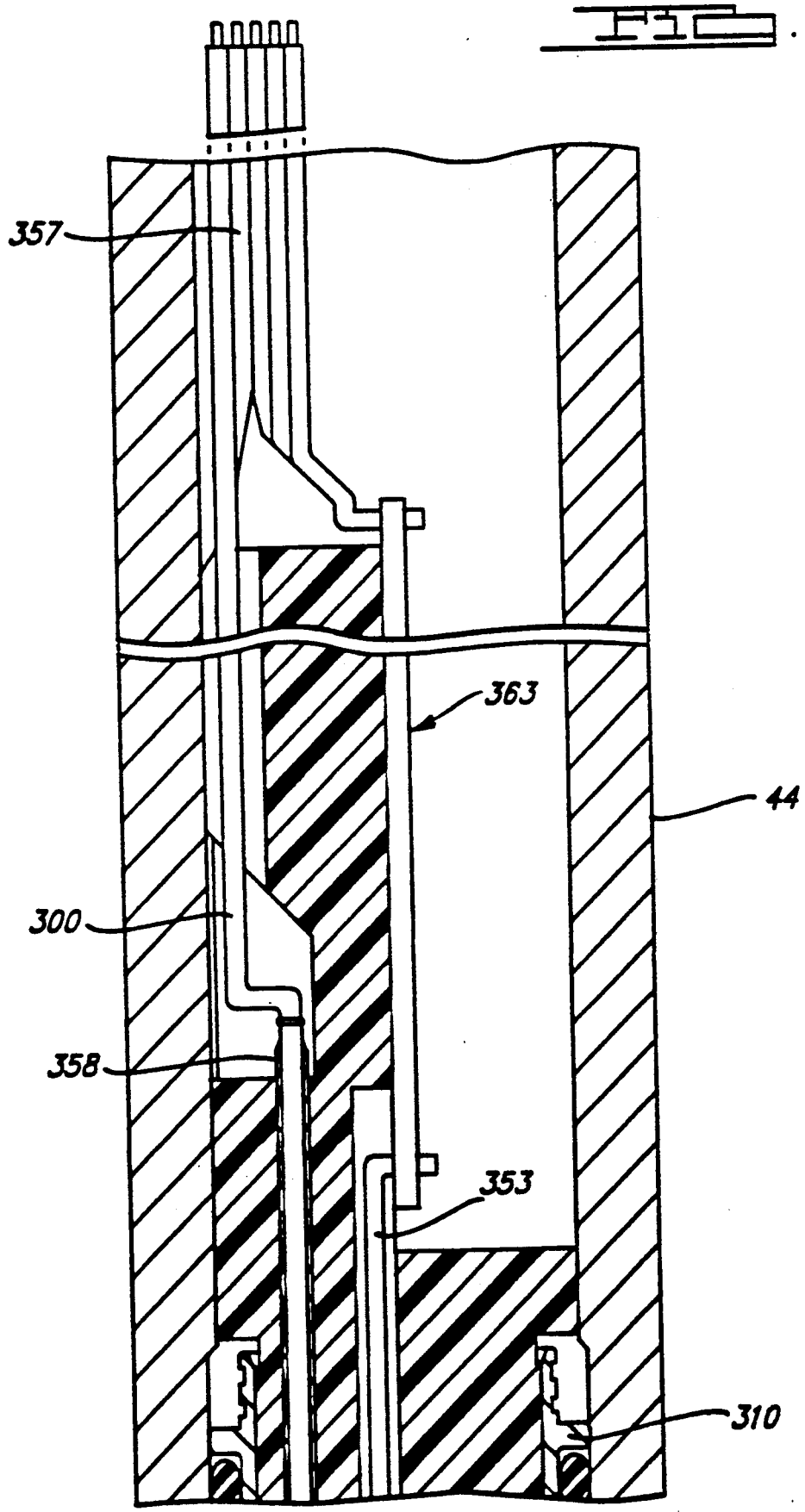

To bias the upper plunger member 246 and the lower plunger member 248 in a downward direction, a helical spring 290 is provided which is disposed coaxially within the upper plunger member 246. The lower portion of the helical spring 290 rests on the step portion 250 of the upper plunger member 246. The upper portion of the spring 290 rests on the lower surface of the annular coil sleeve 288. To allow the coil 286 to receive current from the electronic control module 34, the shock absorber 10 further comprises a pin 292. The pin 292 is disposed in a bore 293 which extends downwardly from the upper surface 294 of the annular coil sleeve 288. Wound around the upper portion of the pin 292 is a first lead 295 from the coil 286. A solder region 296 allows electrical communication between the lead 295 and one of two conductors 300 which is disposed within the bore 297 and used to allow electrical communication between the lead 295 and a flex circuit described below. While only one pin 292 is shown in FIG. 6A, it will be understood that another pin similar to pin 292 exists on the annular coil sleeve 288 which is able to accommodate the second lead 297 from the coil 286. The second lead 297 is therefore able to electrically communicate with another of the conductors 300.

To determine whether the shock absorber 10 is in compression or rebound, a pressure sensor 308 is provided. The pressure sensor 308 is electrically connected to the signal conditioning circuits described below through four conductors 353 which are electrically connected to the pressure sensor 308 via the leads 352. The pressure sensor 308 is supported in the piston rod 44 by a header 310 which is disposed in the piston rod 44 at a position above the annular coil 286. The header 310 is annularly shaped and has three radially extending grooves 312, 314 and 316 on the outer periphery thereof. The groove 312 is used to accommodate an annular seal 318 which is disposed in the groove 312 between the piston rod 44 and the header 310. In addition, the groove 314 is used to accommodate an annular seal 320 which is also disposed between the piston rod 44 and the header 310, though at a position below the seal 318. The groove 316 is used to accommodate a radially inwardly directed tab 322 which is disposed at the upper end of the piston post 44. Because the groove 316 engages the tab 322, the tab 322 prevents movement of the header 310 within the piston rod 44. An anti-rotation pin 323 extends radially inward through the tab 322 and engages the header 310 so as to prevent rotational movement of the header 310 with respect to the piston post 78.

The pressure sensor 308 is secured to the lower surface of the header 310 by means of an annular tube 324 which is preferably fabricated from Kovar. The annular tube 324 is disposed in an upwardly extending bore 325 extending upwardly from the lower surface of the header 310. The annular tube 324 may be preferably secured to the bore 325 by epoxy cement, and the pressure sensor 308 may also be preferably secured to the lower surface of the annular tube 324 by epoxy cement. To allow the upper surface of the pressure sensor 308 to receive damping fluid from the upper portion of the working chamber 50, the header 310 includes a radially extending pressure passage 328. The pressure passage 328 allows damping fluid to fluidly communicate between the upper surface of the pressure sensor 308 and pressure passage 330 which is the region between the piston rod 44 and the piston post 78. The pressure passage 330 in turn fluidly communicates in turn with the pressure passage 332 which extends radially through the piston rod 44 into the upper portion of the working chamber 50. Accordingly, damping fluid from the upper portion of the working chamber 50 is able to fluidly communicate with the upper surface of the pressure sensor 308 through the pressure passage 328, the pressure passage 330 and the pressure passage 332.

To allow the lower surface of the pressure sensor 308 to be exposed to damping fluid at the same pressure as that which is in the lower portion of the working chamber 50, a pressure cavity 334 is provided. The pressure cavity 334 is disposed immediately adjacent to the lower surface of the pressure sensor 308. The upper surface of the pressure cavity 334 is formed by the header 310, while the sides of the pressure cavity 334 are formed in part by an annulus 336 which is disposed adjacent to the inside periphery of the piston post 78 at a position immediately below the header 310. The lower surface of the pressure cavity 334 as well as a portion of the side of the pressure cavity 334 is formed by a spacer 338 which will be more thoroughly described below.

The spacer 338 is disposed in the piston rod 44 between the pressure sensor 308 and the coil 286. To allow damping fluid in the pressure passage 289 of the annular coil 286 to fluidly communicate with the pressure cavity 334, the spacer 338 further comprises a central bore 348. The central bore 348 extends axially through the spacer 338 from the pressure cavity 334 to the region immediately adjacent the coil 286. In addition, the spacer 338 includes a bore 350 which extends also axially through the spacer 338. The bore 350 permits one of the conductors 300 from the coil 286 to pass through the spacer 338. A second bore (not shown) similar to the bore 350 is also located in the spacer and allows another of the conductors 300 to pass therethrough.

To allow the conductors 300 of the coil 286 and the conductors 353 from the pressure sensor 308 to pass through the header 310, the header 310 has four bores 354 and two bores 356 which extend axially through the header 310. Each of the bores 356 is sufficient to accommodate one of the two conductors 300 as it passes through the header 310.

In addition, the bores 356 are sufficiently large to accommodate a plurality of axially extending tubes 358 each of which extend through one of the bores 356. The tubes 358 are used to facilitate electrical connection between the coil 286 and the signal conditioning circuit assembly described below. A glass frit 359 is disposed in the region between each of the tubes 358 and the walls of the bores 356 through which the tubes 358 extend. The glass frit 359 disposed within the bores 356 is used to seal the bores 356 as well as to electrically isolate the tubes 358. Further, each of the conductors 300 are secured and sealed to the upper portion of the tube 358 through which the conductors 300 extend by solder at the upper portion of the tubes 358. Each of the conductors 353 are secured and sealed to the bores 354 through which they extend by means of glass frit 361 disposed between the walls of each of the bores 354 and the conductors 353.

The conductors 300, which electrically communicate with the annular coil 286, as well as the conductors 353, which electrically communicate with the pressure sensor 308, are electrically connected to a flex circuit 357 which is connected to a signal conditioning circuit assembly 363. The signal conditioning circuit assembly 363 is used to condition the signals received from the pressure sensor 308 which in turn are delivered to the electronic control module 34 through the flex circuit 357. In addition, the signal conditioning circuit assembly 363 also permits direct electrical communication between the flex circuit 357 and the conductors 300 (i.e., without signal conditioning) which in turn electrically communicates with the coil 286. The signal conditioning circuit assembly 363 may include electronic components which are able to temperature compensate, buffer and amplify the output from the pressure sensor 308. While the signal conditioning circuit assembly 363 may be that which is disclosed in [Tenneco case No. 1316N-01494], other suitable signal conditioning circuit assemblies may be used.

As discussed above, the electronic control module 34 is used for controlling the damping characteristics of the shock absorbers 10 in response to the movement of the body and wheel of the automobile 12. For determining the relative velocity of the body 30, a plurality of accelerometers 364 are provided as shown in FIG. 7. The accelerometers 364 may be attached to the body near each wheel, or may be physically located within the piston rod 44 of each of the shock absorbers 10. As more fully discussed below, the output from each of the accelerometers 364 are integrated so as to determine the velocity at which the corner of the body 30 associated with the shock absorber 10 is moving. To decide whether the shock absorber 10 is in compression or rebound, the electronic control module 34 determines whether the output from the pressure sensors 308 associated with a shock absorber 10 is either positive or negative. For example, a positive output from the pressure sensor 308 indicates that the shock absorber 10 is in compression while a negative output from the pressure sensor 308 indicates that the shock absorber 10 is in rebound. By appropriately processing the information from the pressure sensor 308 and the accelerometer 364, the electronic control module 34 can adjust the damping characteristics of the shock absorber 10 to provide the desired ride and road holding characteristics.

The operation of the electronic control module 34 will now be described in greater detail. As shown in FIG. 7, the electronic control module 34 comprises a plurality of low-pass filters 366. Each of the low-pass filters 366 receives the output from one pressure sensor 308 or the output from one of the accelerometers 364. The low-pass filters 366 are used for eliminating high frequency signals and to provide anti-aliasing which might otherwise interfere with the operation of the electronic control module 34. The outputs from the low-pass filters 366 are delivered to a microprocessor 374. While the microprocessor may comprise an Intel 8097, other suitable microprocessors might be used.

The microprocessor 374 also receives input from the mode select switch 32. As discussed above, the mode select switch 32 is used by the driver for selecting the type of driving characteristics which are desired. For example, the driver of the automobile may either want firm damping characteristics, soft damping characteristics, or may want the electronic control module 34 to select the damping characteristics. In addition, the microprocessor 374 also receives input from a system undervoltage detection circuit 376. The system undervoltage detection circuit 376 is used to indicate to the microprocessor 374 that a low voltage condition (i.e., below 8.5-9.0 volts) is being experienced by the vehicle's electrical system which is generally indicated by the box designated by the numeral 378. When this occurs, the microprocessor 374 deactivates automatic damping system so as to provide firm damping during both compression and rebound.

The microprocessor 374 also receives the output from a power supply 380 which is connected to the vehicle igniting system 382. The power supply 380 and vehicle ignition system 382 of the automobile 12 generates three signals which are used by the electronic control module 34. The power supply 380 first generates a five-volt signal which is used for providing the supply voltage for the electronic control module 34. In addition, the power supply 380 generates a reset signal which is used by the microprocessor 374 to indicate that the ignition switch on the automobile has just been activated. Finally, the microprocessor 374 generates a pulse train (250-350 Hz) which is used for providing watchdog timing pulses to the power supply 380 so as to inhibit system reset.

The microprocessor 374 is used for executing the instructions which are provided in an EPROM 384 as will be more fully discussed below. The microprocessor 374 and the EPROM 384 are electrically connected to a RAM 386 which is used during the execution of the program stored in the EPROM 384. The microprocessor 374 also communicates with an EEPROM 388 which is used to receive and store the most recent diagnostic data concerning the failure modes of each of the shock absorbers 10, as well as data concerning the pressure sensor 308, the accelerometers 364, the coils 286, as well as the solenoid drivers 392. In addition, the microprocessor 374 electrically communicates with an external watchdog circuit 390 which prevents the coil 286 of each of the shock absorbers 10 from activating during power-up. In addition, the external watchdog circuit 390 monitors the output from the microprocessor 374 to determine whether the output is within a given range (i.e., 250–550 Hz). If the output of the microprocessor 374 is not with the given range, the external watchdog circuit 390 prevents the coils 286 from energizing.

The output from the microprocessor 374 containing information on how the coil 286 of each of the shock absorbers 10 should be energized is delivered to the solenoid drivers 392. The solenoid drivers 392 are used for controlling the current which is delivered to the coil 286 associated with each shock absorber 10. The solenoid drivers 392 may be used for providing a relatively high current to the coil 286 so as to cause the position of the lower plunger member 248 to change, then reducing the current to a holding current so as to maintain the position of the lower plunger member 248 while preventing the coil 286 from burning out.

In addition, the electronic control module 34 comprises a failsafe detection circuit 393. The failsafe detection circuit 393 is used for shutting down the operation of the damping system in the event that a short or open circuit is detected in any of the coils 286.

For development purposes, it may also be useful to have the electronic control module 34 include a serial data link circuit 394, a LED panel 396, as well as a digital-to-analog converter 400. The data link circuit 394 is used to provide an RS232 interface between the microprocessor 374 and development tools such as an external computer. The LED panel 396 may be used to visually indicate whether each of the shock absorbers 10 are adjusted to provide firm or soft damping during compression and rebound. The digital-to-analog converter 400 may be used to provide an analog output for purposes of adjusting various system parameters described below and for monitoring internal signals.

Before discussing the operation of software which is shown in FIGS. 8–14, it will be noted that two alternative methods have been developed for causing the shock absorbers 10 to provide firm damping during both compression and rebound if the amplitude of the vertical movement of the wheel becomes too great at the resonant frequency of the wheels. In the first method, a high-pass filter is used to initially filter the frequency of the vertical movement of the wheel so as to allow only frequencies at or above the resonance frequency (i.e., RESONANCE FREQUENCY) of the wheel to be considered. Then if the amplitude of the wheel movement exceeds a given threshold (i.e., WHEEL_CONTROL_THRESHOLD) when the frequency exceeds the resonance frequency, the microprocessor 374 causes firm damping to be provided during both compression and rebound. The high-pass filtering method may also involve rectifying the output from the high-pass filter and passing it through a low-pass filter so as to smooth the signal. In the second method, the discrete fourier transform of the differential pressure between the upper and lower portions of the working chamber is first calculated. The discrete fourier transform is then compared to a threshold, the exceedance of which will cause firm damping during both compression and rebound. The manner in which each of these methods are used will be described below.

The MAIN routine, which is shown in FIG. 8, acts as a scheduler for the program. The first step in the MAIN routine is step 404 which causes the INITIALIZATION routine to be performed. As more fully discussed below, the INITIALIZATION routine, represents a portion of the MAIN routine, which is used for clearing RAM data storage space as well as for initializing and reserving storage space for the stack pointer. After step 404 is executed, the step 408 is executed. At step 408, the microprocessor 374 initializes certain variables to indicate that the left front shock absorber 10 will be the first to be evaluated. In this regard, the variable CORNER which represents the data location of the information regarding one of the four shock absorbers 10 is set equal to a memory location which represents the base location of the data concerning the left front shock absorber. Further, the variable SOL_MASK is set to 00 00 00 11 bitwise which is used in the DECIDE routine described below to indicate which of the four shock absorbers 10 is currently under evaluation. Finally, the variable CONSTANT is set equal to a value which indicates that the data from either of the two front shock absorbers is being considered.

After executing step 408, the microprocessor 374 executes step 410. At step 410, the microprocessor 374 determines whether a timer interrupt has occurred which happens every two milliseconds. If the timer interrupt has not occurred at the time step 410 is executed, step 410 is again executed to determine whether a timer interrupt has occurred. This process continues until the microprocessor 374 determines at step 410 that a timer interrupt has occurred.

After the microprocessor 374 determines that a timer interrupt has occurred at step 410, the microprocessor 374 executes step 412. At step 412, the microprocessor 374 determines whether the driver of the automobile 12 has set the mode select switch 32 in automatic mode. If the microprocessor 374 determines at step 412 that the mode select switch 32 is not in automatic mode, the microprocessor 374 executes step 414. At step 414, the microprocessor 374 determines whether the driver of the automobile 12 has set the mode select switch 32 in manual mode. If the microprocessor 374 determines at step 414 that the mode select switch 32 is not in manual mode, the microprocessor 374 executes step 414 in which a diagnostic routine may be executed. If the microprocessor 374 determines at step 414 that the driver of the automobile 12 has set the mode select switch 32 in manual mode, the microprocessor 374 then executes step 418 in which the MANUAL portion of the MAIN routine is executed which is discussed below. After the MANUAL portion of the MAIN routine is executed at step 418, the microprocessor 374 then returns to step 420 discussed above.

If the microprocessor 374 determines at step 412 that the driver of the automobile 12 has set the mode select switch 32 in automatic mode, the microprocessor 374 executes step 420. As more fully described below, step 420 calls the CALC_VEL routine which is used to calculate the vertical velocity of the corner of the body from the outputs from one of the accelerometers 364 which corresponds to that corner. After the microprocessor 374 executes step 420, the microprocessor 374 executes step 422 in which the PRESSURE routine is called. As more fully described below, the PRESSURE routine is used to determine whether the shock absorber 10 in question is either in compression or rebound.

As discussed above, there are two alternative methods which may be used to cause the shock absorber 10 to provide firm damping during compression and rebound if excessive vertical wheel movement occurs. If the high-pass filtering method is used, the microprocessor 374 executes step 425 in which the microprocessor 374 determines whether the frequency of vertical movement of the wheel exceeds the resonant frequency of the wheel (10-15 Hz) by using a high-pass filtering routine.

After executing step 425 or if at step 422 the discrete fourier transform method is used to determine whether there is excessive vertical wheel movement, the microprocessor 374 executes step 424 in which the DECIDE routine is called. As described below, the DECIDE routine is used for determining whether the shock absorber 10 in question should be adjusted so as to provide a firm or soft damping characteristics. After executing step 424, the microprocessor 374 executes step 426 in which the SOLENOID routine is called. As discussed below, the SOLENOID routine is used for determining whether the coil 286 should be energized or deenergized. After the step 426 has been executed, the microprocessor 374 executes step 428. At step 428, the microprocessor 374 determines whether the value of the variable CORNER is equal to the RAM address location where information regarding the right rear shock absorber is stored.

If the value of CORNER is equal to a RAM address location where in formation concerning the right rear shock absorber is stored and the discrete fourier transform method is used for causing firm damping upon excessive vertical wheel movement, the microprocessor 374 executes step 430. At step 430, the microprocessor 374 calls the AMPLITUDE routine which takes the discrete fourier transform of the output from the pressure sensor 308. The discrete fourier transform of the output of the pressure sensor 308 is then set equal to the variable AMP which is used in the DECIDE routine described below. The discrete fourier transform is calculated by the AMPLITUDE routine according to the following equation:

$$AMP = \left[ \left( \sum_{t=0}^{T} RP_t \times \sin\frac{2pt}{T} \right)^2 + \left( \sum_{t=0}^{T} RP_t \times \cos\frac{2pt}{T} \right)^2 \right]$$

where:
$P_t$ is the differential pressure between the upper portion and the lower portion of the working chamber 50 at time t; and
T is the period of the resonant frequency of the wheels of the automobile 12 (i.e., the reciprocal of RESONANCE FREQUENCY).

Each time step 430 is executed, the discrete fourier transform of pressure response for a different shock absorber is calculated. Further, step 430 is unnecessary if the high-pass filter method of determining whether there is excessive vertical wheel movement is used. After executing step 430, or if at step 428 the high-pass filter method is used for causing firm damping upon excessive vertical wheel movement and the variable CORNER is equal to the RAM address location where information regarding the right rear shock absorber is stored, the microprocessor 374 executes step 431. At step 431, the microprocessor 374 causes the LED panel 396 to illuminate to provide an indication of whether a firm or soft compression and rebound stroke is desired for each shock absorber. Step 431 is generally used for developmental purposes. After executing step 431, the microprocessor 374 executes step 408 discussed above.

If the value of the variable CORNER is not equal to the RAM address location where information regarding the right rear shock absorber is stored, as determined at step 428, the microprocessor 374 executes step 432. At step 432, the microprocessor 374 shifts the bit pattern in SOL_MASK to the left by two bits. For example, if the last shock absorber 10 to be evaluated was the left corner shock absorber, the SOL_MASK bit pattern would change from 00 00 00 11 to 00 00 11 00. Also at step 432, the value of the variable CORNER is increased by an offset so as to indicate the address of the data regarding the next shock absorber 10 which is to be adjusted.

After executing step 432, the microprocessor 374 executes step 434 which determines whether the value of the variable CORNER is greater than the base RAM address location where information regarding the rear shock absorbers 10 are stored. Accordingly, step 434 determines whether the data concerning the front shock absorbers is being reviewed, or is the data concerning the rear shock absorbers being reviewed. As discussed below, different parameters are used with the front shock absorbers 10 as compared to the rear shock absorbers 10.

If at step 432 the microprocessor 374 determines that the value of the variable CORNER is not greater than the base RAM address location where information regarding the rear shock absorbers 10 are stored, the microprocessor 374 executes step 420 discussed above. If at step 434 the microprocessor 374 determines that the value of the variable CORNER is greater than the base RAM address location where information regarding the rear shock absorbers are stored, the microprocessor 374 executes step 434 in which the variable CONSTANT is set equal to a value which indicates that a rear shock absorber is being evaluated. After executing step 436, the microprocessor 374 executes step 420 discussed above.

The INITIALIZATION routine, which represents a portion of the MAIN routine, will now be described with reference to FIG. 9. The first step in the INITIALIZATION routine is step 440 in which the outputs of the microprocessor 374 which are delivered to the solenoid drivers 392 are disabled. After executing step 440, the microprocessor 374 executes step 442 which causes a one second delay to occur. This delay allows the pressure sensors 308 as well as the accelerometers 364 to power-up and thereby generate a signal indicative of current status of the shock absorber 10. After executing step 442, the microprocessor 374 executes step 444. At step 444, the microprocessor 374 determines whether serial communication has been requested via the data link circuit 394. If communication has been requested as determined by step 442, the microprocessor 374 executes step 446 in which establishes a serial communications port. After executing step 446 or if at step 444 the microprocessor 374 determines that serial communication has not been requested, the microprocessor then executes step 448.

At step 448, the microprocessor 374 determines whether the parameters used for adjusting the shock absorbers 10 have been altered. The parameters which are used by the microprocessor 374 are given below:
FIRM-ON TIME: The number of cycles which the shock absorber is held in firm rebound or firm compression (typically 50 cycles depending on the vehicle type and the desired ride characteristics).

WHEEL_CONTROL_THRESHOLD: Is used as a threshold for determining whether the DECIDE routine should cause the shock absorber in question to provide firm damping during compression and rebound (typically 90 psi).

RESONANCE FREQUENCY: Is the resonant frequency of the wheels of automobile 12 (typically 10–12 Hz).

POS_THRESHOLD: Is the positive velocity threshold, the exceedance of which will cause the DECIDE routine to signal a firm rebound stroke (typically 5–8 inches/sec.).

NEG_THRESHOLD: Is the negative velocity threshold, the exceedance of which will cause the DECIDE routine to signal a firm compression stroke (typically 5–8 inches/sec.).

PRESS_DEADBAND: Is used to set a level between which a pressure signal is considered noise.

Because the damping characteristics of the front shock absorbers are generally different than the damping characteristics of the rear shock absorbers, the value of these parameters for a given shock absorber will depend in part on whether the shock absorber is located in the front or the rear of the automobile 12 (i.e., a different set of parameters is used for the front set of shock absorbers than is used for the rear set). These parameters are stored in the memory of the microprocessor 374 and will be used unless the microprocessor 374 determines at step 448 that the parameters have been altered. If at step 448 the microprocessor 374 determines that the parameters have not been altered, the microprocessor 374 executes step 450 which loads the default parameters into the memory of the microprocessor 374.

After executing step 450, or if at step 448 the microprocessor 374 determines that the parameters have been altered, the microprocessor 374 executes step 452 in which the storage locations in the RAM 386 other than those storing the parameters are cleared. After executing step 452, the microprocessor 374 executes step 454 in which the microprocessor 374 reads and computes the DC bias voltages from the pressure sensors 308 and the accelerometers 364.

After executing step 454, step 406 is executed which initializes the interrupts. These interrupts include the cycle time interrupt which is set at two milliseconds, as well as a discrete fourier transform interrupt (if a discrete fourier transform is used) which is used when the pressure values of the pressure sensors 308 to be read. An interrupt is also used for pulsing voltage to the coil 286 if the coil 286 is driven by pulse width modulation. An interrupt may also be associated with external data communications if desired during development. After executing step 406, the microprocessor 374 causes step 408 of the MAIN routine to be executed.

The CALC_VEL routine will now be described with reference to FIG. 10. The first step in the CALC_VEL routine is step 460 in which the microprocessor 374 converts the analog output of one of the accelerometers 364 into digital form and sets the digitized value of the acceleration equal to the variable ACC. After the acceleration is read at step 460, the microprocessor 374 performs high-pass filtering to determine the D.C. bias voltage by executing the steps 462-470. At step 462, the D.C. average acceleration AVE_A, which is determined from the DC bias voltage of the accelerometers 364, is read from memory. After executing step 462, the microprocessor 374 executes step 464 which adds the value of ACC to the DC average acceleration AVE_A and sets this value equal to AVE_A.

After executing step 464, the microprocessor 374 executes step 466 in which the value of AVE_A divided by the constant K is subtracted from the value of AVE_A. The value of the constant K in the CALC_VEL routine is equal to 500 to give a cutoff frequency of 0.16 Hz. The result of this subtraction is then assigned to the variable AVE_A'. After executing step 466, the microprocessor 374 executes step 468. At step 468, the value of AVE_A' divided by the value of the constant K is subtracted from the value of ACC. This value is then set equal to the variable ACC. After executing step 468, the microprocessor 374 executes step 470 which stores the value of AVE_A' memory which is used as the DC average acceleration for the next cycle for the shock absorber 10 under consideration. After executing step 470, the microprocessor 374 executes step 472 in which velocity is calculated by multiplying the value of ACC by the change in time from the last time that velocity was calculated for the shock absorber 10 under consideration (approximately 2 milliseconds) and is added to the value of the variable VEL which represents the vertical velocity of the corner of the body. The result of this addition is then assigned to the variable VEL. After executing step 472, the microprocessor 374 executes step 474 in which the value of the variable VEL is stored in memory. The microprocessor 374 then executes step 476 in which the microprocessor 374 is instructed to use the next A/D channel for the next input (i.e., from the pressure sensor 308). Control is then returned to the MAIN routine by the return step 478.

Figure 11:
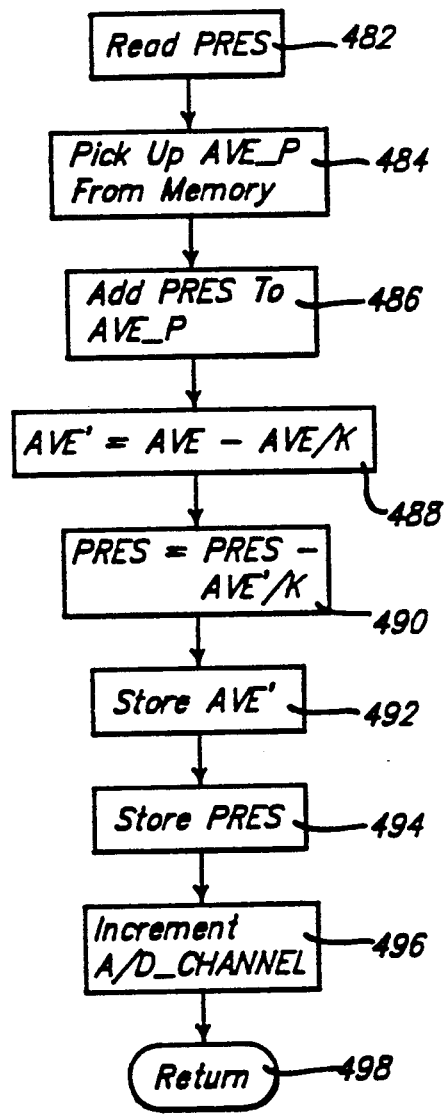
FIG. 11 is a flow chart of the PRESSURE routine which is used by the microprocessor shown in FIG. 8 for controlling the shock absorber shown in FIG. 2.

The PRESSURE routine will now be described with reference to FIG. 11. The first step of the PRESSURE routine is step 482 which causes the microprocessor 374 to convert the analog output of one of the pressure sensors 308 into digital form and sets this output equal to the variable PRES. After reading the pressure from the pressure sensor 308 at step 482, the microprocessor 374 performs high-pass filtering which determines the DC bias voltage of the output of the pressure sensor 308. After reading the DC average pressure AVE_P from memory at step 484, the microprocessor 374 executes step 486 in which the current pressure PRES is added to the DC average pressure AVE_P. The result of this addition is assigned to the variable PRES. After executing step 486, the microprocessor 374 executes step 488 in which the value of AVE_P is first divided by the constant K and then is subtracted from the value of AVE_P. The result of this subtraction is then assigned to the variable AVE_P'. The value of K in the PRESSURE routine is equal to 6.5535 which corresponds to a cutoff frequency of 0.001 Hz. After executing step 488, the microprocessor 374 executes step 490 which first divides the value of AVE_P' by K and then subtracts the resulting value from the value of the variable PRES to give absolute pressure. The resulting value is assigned to the variable PRES. After executing step 490, the microprocessor 374 executes step 492 which stores the value of AVE_P' in memory for the next cycle for the shock absorber 10 under consideration. Step 494 is then executed which stores the value of PRES in memory. After executing step 494, the microprocessor 374 executes step 496 in which the microprocessor 374 is instructed to use the next A/D channel for the next input (i.e., the output from the accelerometer 364 of the next shock absorber 10 to be examined). The control is then returned to the MAIN routine by return step 500.

Figure 12:
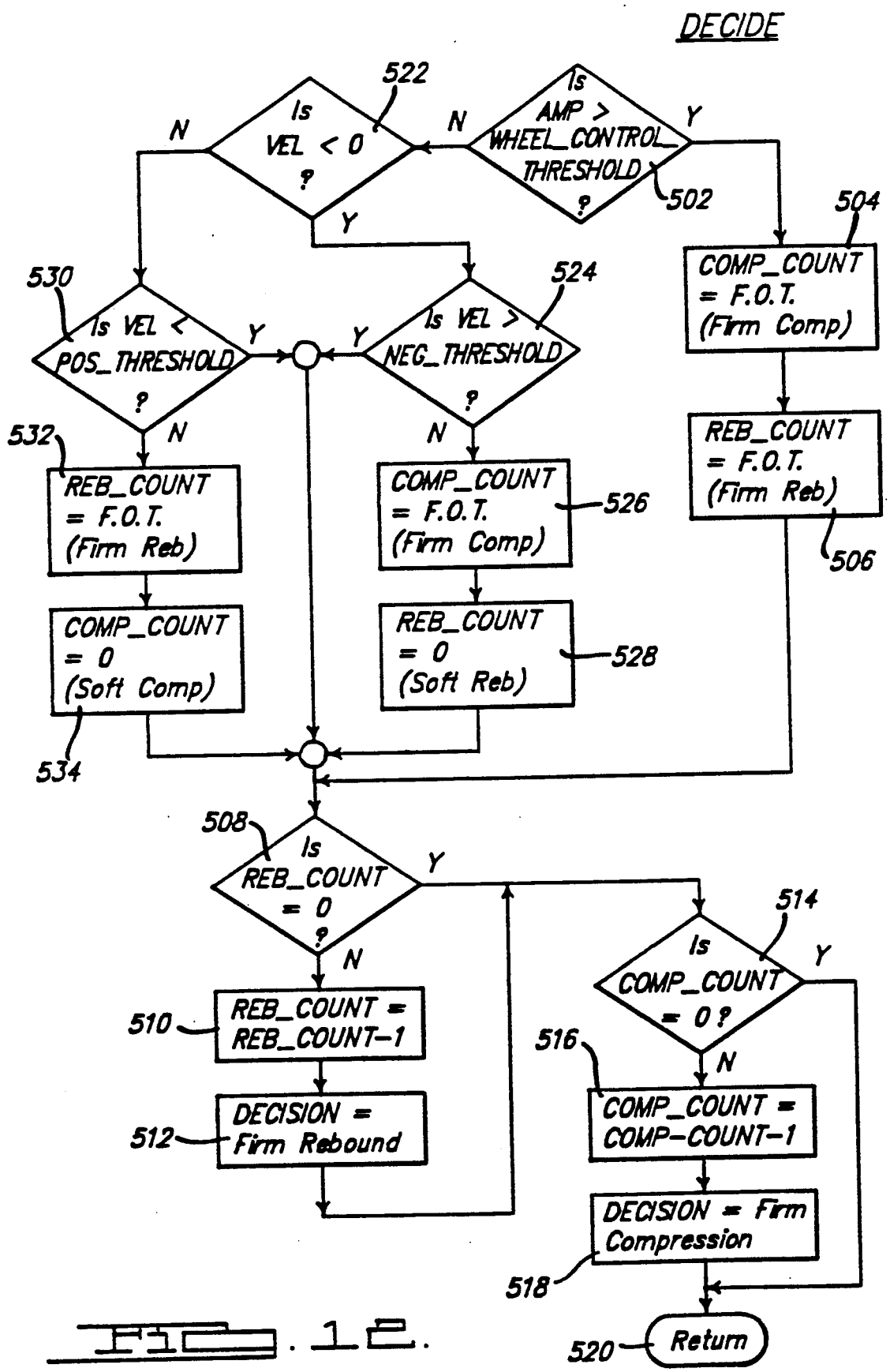
FIG. 12 is a flow chart of the DECIDE routine which is used by the microprocessor shown in FIG. 8 for controlling the shock absorber shown in FIG. 2.

The DECIDE routine will now be described with reference to FIG. 12. The first step in the DECIDE routine is step 502 in which the microprocessor 374 determines whether the variable AMP is greater than the parameter WHEEL_CONTROL_THRESHOLD. If the value of the variable AMP is greater than the value of WHEEL_CONTROL_THRESHOLD, there is excessive vertical movement of the wheels and therefore both firm compression and firm rebound are desired. Accordingly, the microprocessor 374 executes step 504 which equates the compression timer COMP_COUNT to the parameter FIRM-ON TIME which is equal to 50 cycles. After executing step 504, the microprocessor 374 executes step 506 in which the rebound timer REB_COUNT is equal to the value of the parameter FIRM-ON TIME which is again equal to 50 cycles. After executing step 506, the microprocessor 374 executes step 508 which determines whether the value of REB_COUNT is equal to zero. If REB_COUNT is not equal to zero, the microprocessor 374 executes step 510 which decrements the value of REB_COUNT by one. After executing step 510, the microprocessor 374 executes step 512 which equates the value of the variable DECISION with the bit pattern indicating that a firm rebound is desired. This is done by anding the bit pattern of SOL_MASK by the bit pattern 55H.

After executing step 512, or if at step 508 the microprocessor 374 determines that REB_COUNT is equal to zero, the microprocessor 374 executes step 514 which is used to determine whether the shock absorber 10 has been in firm compression for the requisite length of time. To perform this function, step 514 determines whether the value of COMP_COUNT is equal to zero. If the value of COMP_COUNT is not equal to zero, the microprocessor 374 executes step 516 which decrements the value of COMP_COUNT by one.

After executing step 516, the microprocessor 374 execute step 518 in which the bit pattern of the variable DECISION is set equal to a value that indicates that a firm compression stroke is desired. This is done by anding the bit pattern of SOL_MASK by the bit pattern AAH. After executing step 518, or if at step 514 the bit pattern of COMP_COUNT is equal to zero, control is returned to the MAIN routine by the return step 520.

If at step 502 the microprocessor 374 determines that the value of AMP is not greater than WHEEL_CONTROL_THRESHOLD, the microprocessor 374 executes step 522. At step 522, the microprocessor 374 determines whether the vertical velocity of the corner of the body 30 is negative by determining whether the value of the variable VEL is less than zero. If the value of the variable VEL is less than zero, the microprocessor 374 executes step 524 which determines whether the downward velocity of the body to which the shock absorber 10 is connected is greater than the negative threshold by determining whether the value of the variable VEL is greater than the parameter NEG_THRESHOLD. If the value of the variable VEL is greater than the parameter NEG_THRESHOLD (i.e., closer to zero), the microprocessor 374 then executes step 508 described above. If the value of the variable VEL is not greater (i.e., more negative) than the parameter NEG_THRESHOLD, the microprocessor 374 executes step 526 which is used to set the compression timer COMP_COUNT to the parameter FIRM-ON TIME. After executing step 526, the microprocessor 374 executes step 528 which is used to set the rebound timer REB_COUNT equal to zero so as to produce a soft rebound stroke. After executing step 528, the microprocessor 374 executes step 508 described above.

If at step 522 the microprocessor 374 determines that the value of the variable VEL is not less than zero, the microprocessor 374 executes step 530. At step 530, the microprocessor 374 determines whether the velocity of the corner of the body 30 is less than a positive threshold by determining whether the value of the variable VEL is less than the parameter POS_THRESHOLD. If the value of VEL is less than the parameter POS_THRESHOLD, the microprocessor 374 executes step 508 described above. If at step 530 the value of VEL is not less (i.e., more positive) than the parameter POS_THRESHOLD, the microprocessor 374 executes step 532. At step 532, the microprocessor 374 sets the rebound timer REB_COUNT equal to 50 cycles so as to obtain a firm rebound stroke. After executing step 532, the microprocessor 374 executes step 534 in which the value of the compression timer COMP_COUNT is set equal to zero so as to produce a soft compression stroke. After executing step 534, the microprocessor 374 then executes step 508 described above.

Figure 13:
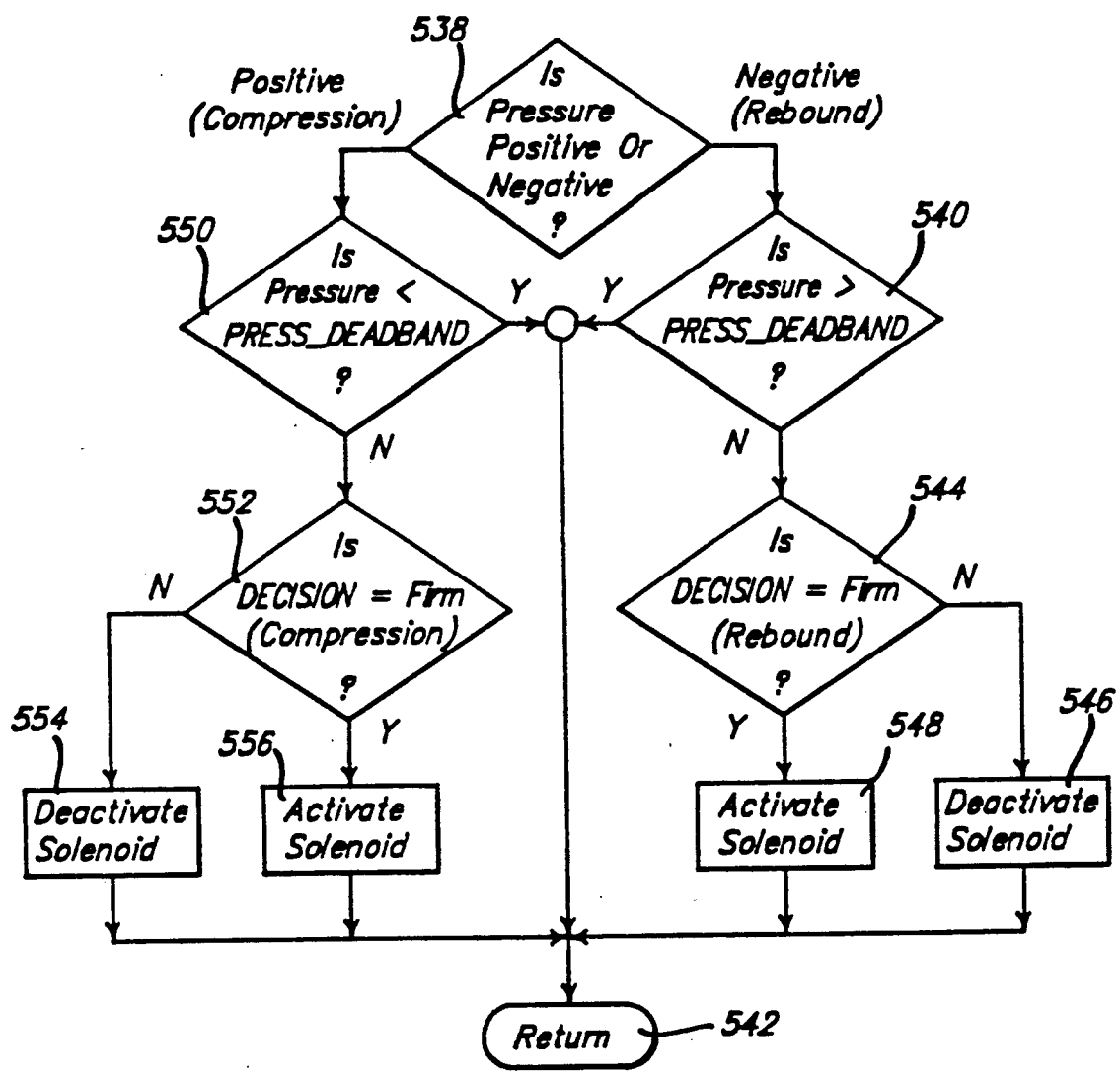
FIG. 13 is a flow chart of the SOLENOID routine which is used by the microprocessor shown in FIG. 8 for controlling the shock absorber shown in FIG. 2.

The SOLENOID routine will now be described with reference to FIG. 13. The first step in the SOLENOID routine is step 538 which is used to determine whether the shock absorber 10 for a given corner is in compression or rebound. This is done by determining whether the pressure sensed by the pressure sensor 308 is positive or negative. If the output from the pressure sensor 308 is negative thus indicating that the shock absorber 10 is in rebound, the microprocessor 374 executes step 540 which determines whether the pressure signal from the pressure sensor 308 is greater than the value of the parameter PRESS_DEADBAND. If at step 540 the microprocessor 374 determines that the output from the pressure sensor 308 is less than the parameter PRESS_DEADBAND, the output of the pressure sensor 308 is assumed to be noise and the microprocessor 374 returns control to the MAIN routine via the return step 542.

If at step 544 the microprocessor 374 determines that the output from the pressure sensor 308 is greater than PRESS_DEADBAND, the microprocessor 374 executes step 544 which determines whether the bit pattern of the variable DECISION is equal to a value indicating that a firm compression stroke is desired. If at step 548 the microprocessor 374 determines that the bit pattern of the variable DECISION is equal to a value indicating that a firm compression stroke is desired, the microprocessor 374 executes step 548 which energizes the coil 286. Control is then returned to the MAIN routine via the return step 542. If at step 544 the microprocessor 374 determines that the bit pattern of the variable DECISION is not equal to a value indicating that a firm compression stroke is desired, the microprocessor 374 executes step 546 which deenergizes the coil 286 if it is energized. The microprocessor 374 then returns control to the MAIN routine via the return step 542.

If at step 538 the microprocessor 374 determines that the signal from the pressure sensor 308 is positive thus indicating that the shock absorber 10 is in compression, the microprocessor 374 executes step 550 which determines whether the signal from the pressure sensor 308 is less than the value of the parameter PRESS_DEADBAND. If the pressure signal from the pressure sensor 308 is less than the parameter PRESS_DEADBAND, the output of the pressure sensor 308 is assumed to be noise. Accordingly, the microprocessor 374 returns control to the MAIN routine via the return step 542. If at step 550 the microprocessor 374 determines that the output from the pressure sensor 308 is greater than the parameter PRESS_DEADBAND, the microprocessor 374 executes step 552 which determines whether the bit pattern of the variable DECISION is equal to a value which indicates that a firm compression stroke is desired. If the bit pattern of DECISION is equal to a bit pattern which represents that a firm compression stroke is desired, the microprocessor 374 executes step 556 which energizes the coil 286. The microprocessor 374 then returns control to the MAIN routine via the return step 542. If at step 552 the microprocessor 374 determines the value of DECISION is not equal to a bit pattern which represents that a firm rebound stroke is desired, the microprocessor 374 executes step 554 which deenergizes the coil 286 if energized. After executing step 552, the microprocessor 374 returns control to the MAIN routine via the return step 542.

Figure 14:
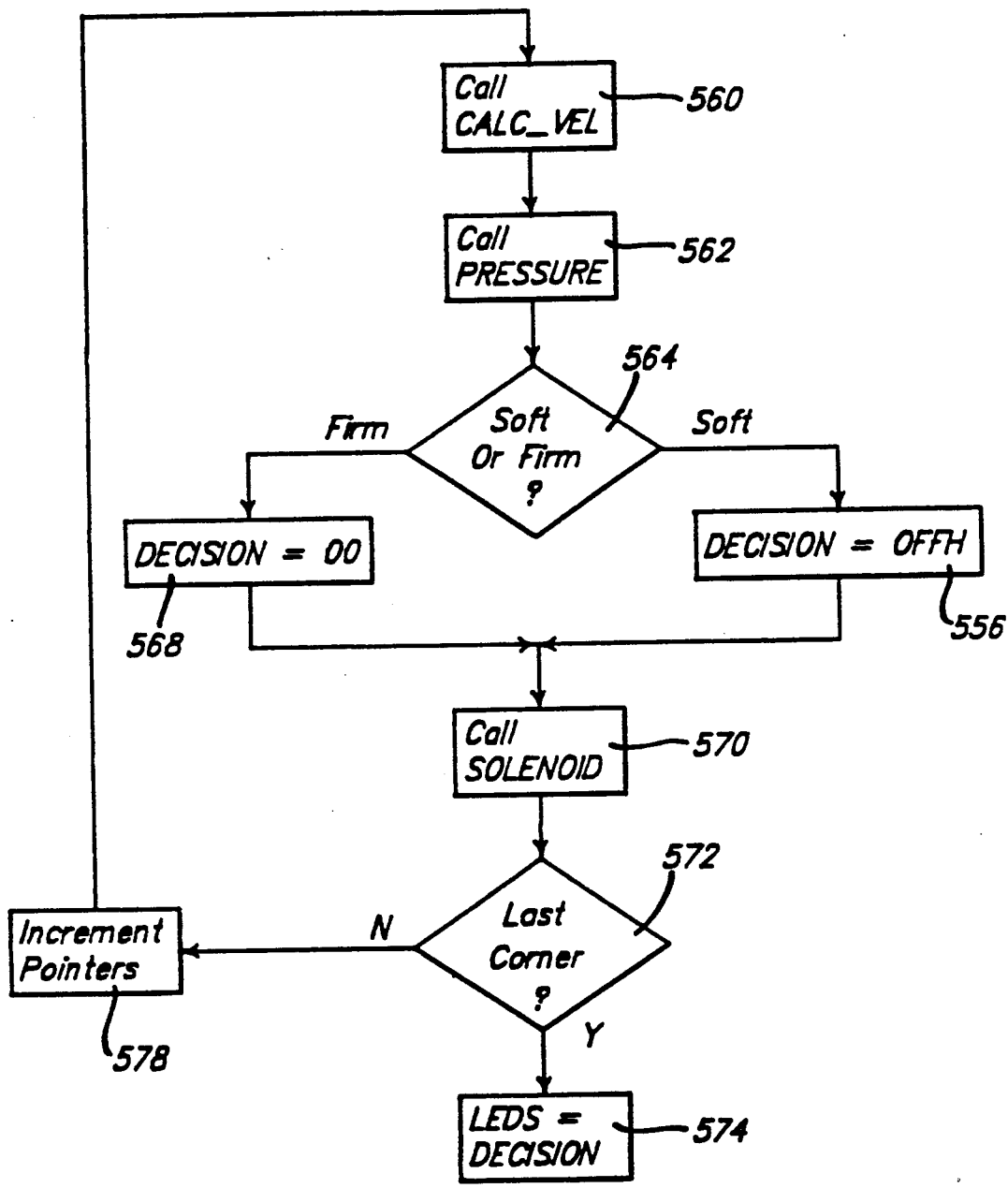
FIG. 14 is a flow chart of the MANUAL portion of the MAIN routine which is used by the microprocessor shown in FIG. 8 for controlling the shock absorber shown in FIG. 2.

The MANUAL portion of the MAIN routine will now be described with a reference to FIG. 14. The first step of the MANUAL routine is step 560 which calls the CALC_VEL routine. After executing step 560, the microprocessor 374 executes step 562 in which the PRESSURE routine is called. After executing step 562, the microprocessor 374 executes step 564 which determines whether the mode select switch 32 has been set to provide either a firm or soft compression and rebound stroke. If the microprocessor 374 determines at step 564 that the mode select switch 32 has been set to provide a soft compression and rebound stroke, the microprocessor 374 executes step 566 which sets the value of DECISION equal to OFFH which indicates that the shock absorber 10 is to produce a soft compression and rebound stroke. If at step 564 the microprocessor 374 determines the mode select switch 32 is set to generate a firm compression and rebound stroke, the microprocessor 374 executes step 568 which sets a bit pattern of DECISION equal to OOH thereby indicating that a firm compression and rebound stroke is to be generated. After executing either steps 566 or 568, the microprocessor 374 executes step 570 in which the SOLENOID routine is called which provides the proper current to the coils 286 to achieve the desired damping characteristics.

After the SOLENOID routine is executed, the microprocessor 374 executes step 572 which determines whether the shock absorber 10 currently being adjusted is the last shock absorber in the sequence (i.e., the sequence left-front, right-front, left-rear, right-rear). If the shock absorber 10 being evaluated is not the last shock absorber in sequence (i.e., is not the right rear shock absorber), the microprocessor 374 executes step 578 in which the pointers are incremented so that the next shock absorber 10 in the sequence will be evaluated. After executing step 578, the microprocessor 374 then executes step 560 in which CALC_VEL is called as described above.

If at step 572 the last shock absorber 10 in the sequence (i.e., the right rear shock absorber) has been evaluated, the microprocessor 374 executes step 574 in which the LED panel 396 is illuminated to provide an indication of whether a firm or soft compression and rebound stroke is desired for each shock absorber. Step 574 is used generally for development purposes. After executing step 574, the microprocessor 374 executes step 574 which directs the microprocessor 374 to execute step 408 of the MAIN routine described above.

Figure 15:
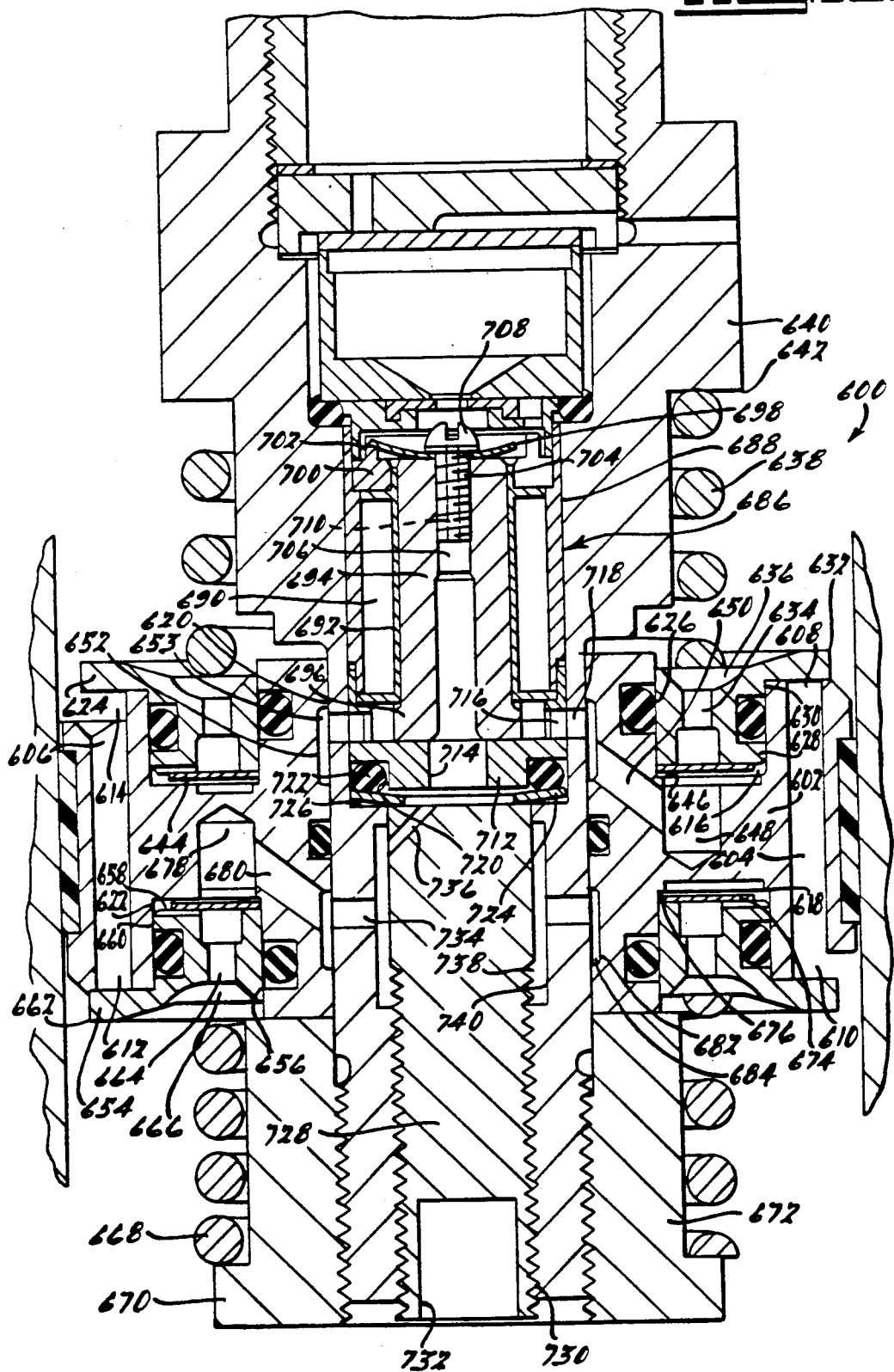
FIG. 15 is a cross-sectional view of the piston assembly and the lower portion of the piston post shown in FIG. 2 according to the second preferred embodiment of the present invention.
Figure 16:
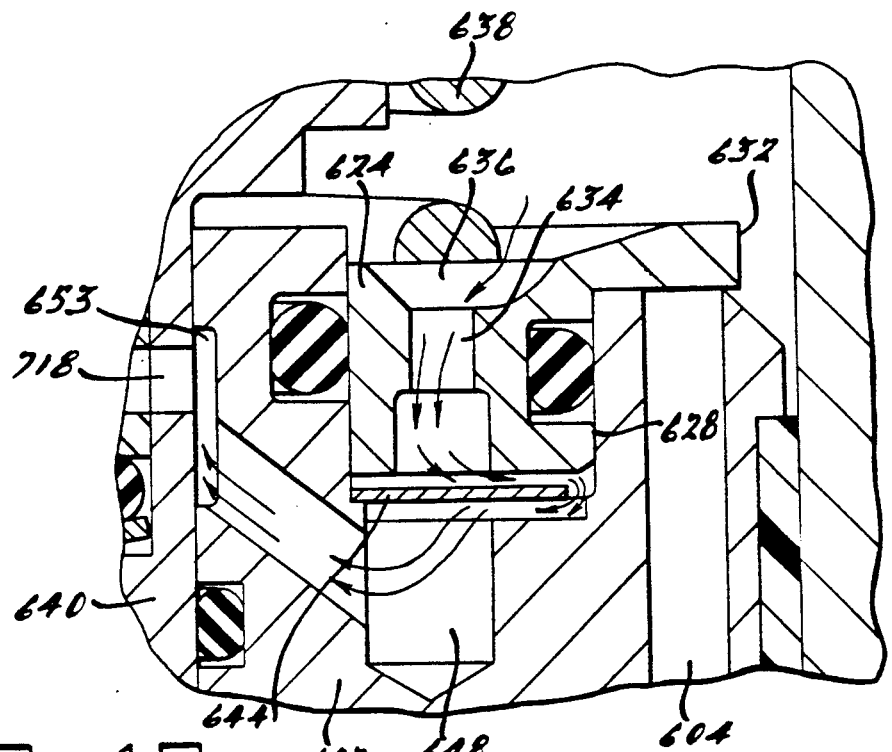
FIGS. 16 and 17 are enlarged cross-sectional views of the piston assembly taken in the region of circle 16 in FIG. 15.
Figure 17:
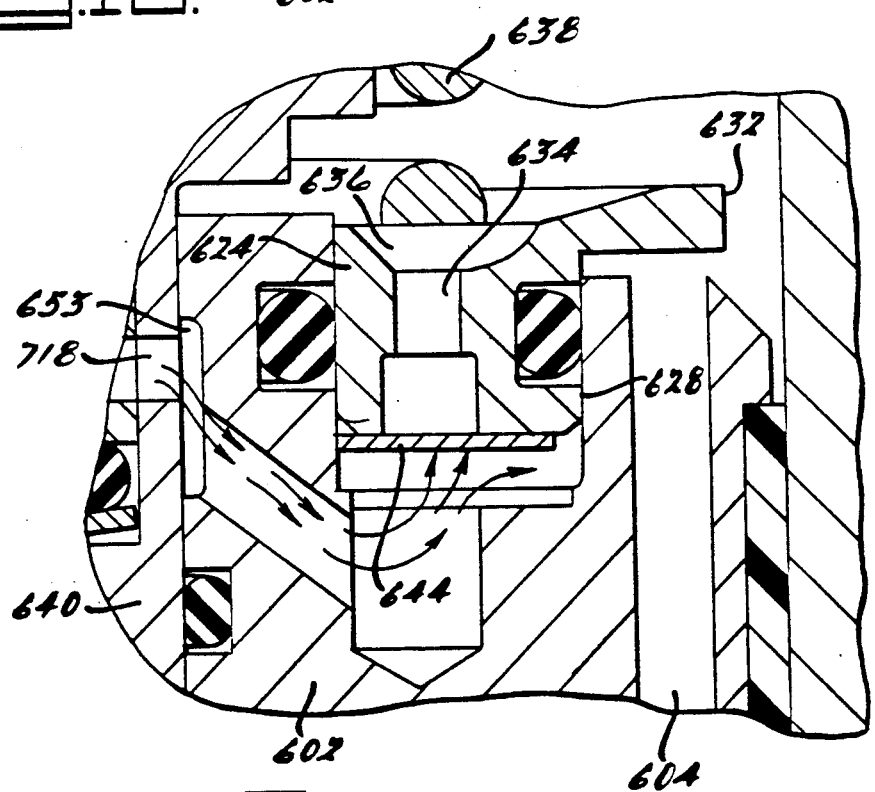

A second preferred embodiment of the present invention will now be described with reference to FIGS. 15, 16 and 17. The piston assembly 600 comprises a valve body 602 having a first and second plurality of vertical flow passages 604 and 606. Each of the vertical flow passages 604 comprises a valve controlled upper outlet end portion 608 and a lower counter-recessed inlet end portion 610. Similarly, each of the vertical flow passages 606 comprises a valve controlled lower outlet end portion 612 and an upper counter-recessed inlet end portion 614. As more fully described below, damping fluid is able to flow through the first plurality of vertical flow passages 604 during compression, while damping fluid is able to flow through the second plurality of vertical flow passages 606 during rebound. By controlling the flow through the first and second pluralities of flow passages 604 and 606, the damping characteristics of the shock absorber 10 may be changed.

In addition, the valve body 602 further comprises an upper annular recess 616 which is disposed coaxially on the upper surface of the valve body 602. Further, the upper annular recess 616 is disposed between the first and second plurality of vertical flow passages 604 and 606 and the inner radial surface 620 of the valve body 602. Further, the valve body 602 also has a lower annular recess 622 which is disposed on the lower surface of the valve body 602. Further, the lower end of the recess 622 is also disposed between the first and second plurality of vertical flow passages 604 and 606 and the inner radial surface diameter of the valve body 602. The upper annular recess 616 and the lower annular recess 622 are used to accommodate an upper unloader and lower unloader respectively as more thoroughly described below.

To vary the flow of damping fluid through the first plurality of vertical flow passages 604, an upper annular unloader 624 is provided which is disposed partially within the upper annular recess 616. The radially inward surface 626 of the upper annular unloader 624 is disposed adjacent to the radially inner surface of the upper annular recess 616. In addition, the lower portion 628 of the radially outer surface of the upper annular unloader 624 mechanically communicates with the radially outer surface 630 of the upper annular recess 616.

The radially outer surface of the upper annular unloader 624 has a radially extended upper portion 632. The radially extended upper portion 632 mechanically communicates with the upper surface of the valve body 602 in such a manner as to prevent the flow of damping fluid through the first plurality of vertical flow passages 604 when an adequate biasing force is placed on the upper annular unloader 624. The central portion of the upper annular unloader 624 includes an axially extending flow passage 634 having an upwardly extending conical portion 636 which is able to receive damping fluid from the upper portion of the working chamber. As more fully described below, damping fluid is able to flow through the axially extending flow passage 634 during rebound, but is unable to flow through the axially extending flow passage 634 during compression.

To bias the upper annular unloader 624 against the upper surface of the valve body 602, a helical coil spring 638 is provided. The helical coil spring 638 is disposed coaxially with, and externally of, the piston post 640 between the upper surface of the upper annular unloader 624 and an annular step portion 642 on the piston post 640. The step portion 642 is disposed on the outer periphery of the piston post 640 at a position above the upper annular unloader 624. Because the helical coil spring 638 is in compression, the helical coil spring 638 biases the upper annular unloader 624 in a downward direction so that the radially extended upper portion 632 of the upper annular unloader 624 is biased against the upper surface of the valve body 602. By biasing the radially extended upper portion 632 of the upper annular unloader 624 against the upper surface of the valve body 602, the flow of damping fluid through the first plurality of flow passages 604 is restricted.

Disposed between the lower surface of the upper annular unloader 624 and the upper surface of the upper annular recess 616 is an upper annular valve disk 644. The upper annular valve disk 644 is used to allow damping fluid to flow from the upper portion of the working chamber through the axially extended flow passage 634 during rebound, but prevent the flow of damping fluid through the axially extended flow passage 634 during compression. To restrict movement of the upper annular valve disk 644, the upper annular recess 616 includes a radially extending valve seat 646. The radially extending valve seat 646 is used to limit downward movement of the radially inward portion of the upper annular valve disk 644 during rebound of the shock absorber.

Disposed immediately below the upper annular valve disk 644 is an axially extending flow passage 648. The axially extending flow passage 648 extends from the upper annular recess 616 in an axially downward direction partially through the valve body 602. When the shock absorber 10 is in rebound, damping fluid is able to flow from the upper portion of the working chamber 50 through the flow passage 634 and against the upper annular valve disk 644. Since the radially inward portion of the upper annular valve disk 644 is secured between the valve seat 646 and the upper annular unloader 624 while the outer radial surface of the upper annular valve disk 644 is unsecured, damping fluid flowing through the flow passage 634 is able to downwardly displace the radially outer surface of the upper annular valve disk 644 in a manner shown in FIG. 16. Because the radially outer surface of the upper annular valve disk 644 is displaced in this manner, damping fluid is able to flow from the upper portion of the working chamber 50 into the flow passage 648 through the flow passage 634.

The flow passage 648 is able to fluidly communicate with a first radially extending flow passage 650 in the valve body 602. The first radially extending flow passage 650 extends from the upper axially extending flow passage 648 to an upper annular recess 652 formed on the inner radial surface of the valve body 602. The upper annular recess 652 is used to form a flow cavity 653 between the radially outer surface of the piston post 640 and the upper annular recess 652.

To vary the flow of damping fluid through the second plurality of vertical flow passages 606, a lower annular unloader 654 is provided which is disposed partially within the lower annular recess 622. The radially inward surface 656 of the lower annular unloader 654 is disposed adjacent to the radially inner surface of the lower annular recess 622. In addition, the upper portion 658 of the radially outer surface of the lower annular unloader 654 mechanically communicates with the radially outer surface 660 of the lower annular recess 622.

The radially outer surface of the lower annular unloader 654 has a radially extended lower portion 662. The radially extended lower portion 662 mechanically communicates with the lower surface of the valve body 602 in such a manner as to prevent the flow of damping fluid through the second plurality of vertical flow passages 606 when an adequate biasing force is placed on the lower annular unloader 654. The central portion of the lower annular unloader 654 includes an axially extending flow passage 664 having a downwardly extending conical portion 666 which is able to receive damping fluid from the lower portion of the working chamber 50. As more fully described below, damping fluid is able to flow through the axially extending flow passage 664 during compression, but is unable to flow through the axially extending flow passage 664 during rebound.

To bias the lower annular unloader 654 against the lower surface of the valve body 602, a helical coil spring 668 is provided. The helical coil spring 668 is disposed coaxially with, and externally of, the piston post 640 between the lower surface of the lower annular unloader 654 and an annular step portion 670 on the piston nut 672. The piston nut 672 is disposed on an externally threaded outer periphery of the piston post 640 at a position below the lower annular unloader 654. Because the helical coil spring 668 is in compression, the helical coil spring 668 biases the lower annular unloader 654 in an upward direction so that the radially extended upper portion 658 of the lower annular unloader 654 is biased against the lower surface of the valve body 602. By biasing the radially extended lower portion 662 of the lower annular unloader 654 against the lower surface of the valve body 602, the flow of damping fluid through the second plurality of flow passages 606 is restricted.

Disposed between the upper surface of the lower annular unloader 654 and the lower surface of the lower annular recess 622 is a lower annular valve disk 674. The lower annular valve disk 674 is used to allow damping fluid to flow from the lower portion of the working chamber 50 through the axially extended flow passage 664 during compression, but prevent the flow of damping fluid through the axially extended flow passage 664 during rebound. To restrict movement of the lower annular valve disk 674, the lower annular recess 622 includes a radially extending valve seat 676. The radially extending valve seat 676 is used to limit upward movement of the radially inward portion of the lower annular valve disk 674 during compression of the shock absorber 10.

Disposed immediately above the lower annular valve disk 674 is an axially extending flow passage 678. The axially extending flow passage 678 extends from the lower annular recess 622 in an axially upward direction partially through the valve body 602. When the shock absorber 10 is in compression, damping fluid is able to flow from the lower portion of the working chamber 50 through the flow passage 664 and against the lower annular valve disk 674. Since the radially inward portion of the lower annular valve disk 674 is secured between the valve seat 676 and the lower annular unloader 654 while the outer radial surface of the lower annular valve disk 674 is unsecured, damping fluid flowing through the flow passage 678 is able to upwardly displace the radially outer surface of the lower annular valve disk 674. Because the radially outer surface of the lower annular valve disk 674 is displaced in this manner, damping fluid is able to flow from the lower portion of the working chamber 50 into the flow passage 678 through the flow passage 664.

The flow passage 678 is able to fluidly communicate with a second radially extending flow passage 680 in the valve body 602. The second radially extending flow passage 680 extends from the axially extended flow passage 678 to a lower annular recess 682 formed on the inner radial surface of the valve body 602. The lower annular recess 682 is used to form a flow cavity 684 between the radially outer surface of the piston post 640 and the lower annular recess 682.

To control the flow of damping fluid between the flow passage 648 and the flow passage 678, the shock absorber 10 further comprises a solenoid 686. The solenoid 686 is disposed coaxially with the axial center line of the piston post 640 and has a housing 688 which engages the radially inner surface of the piston post 640. The solenoid 686 comprises a coil 690 which is wound around a bobbin 692 and is used to axially displace a plunger 694 which is disposed coaxially with the axial center line of the piston post 640. The coil 690 and and the bobbin 692 are also disposed coaxially with the axial center line of the piston post 640.

The plunger 694 includes a radially extended lower flange portion 696 which engages the bobbin 692 of the solenoid 686 when the plunger 694 is retracted so as to limit upper movement of the plunger 694. To bias the plunger 694 in an upward direction, the solenoid 686 further comprises a spring disk 698 and a spacer 700. The spacer 700 is disposed on the upper surface of the bobbin 692 and includes an axially extending annular projection 702 which mechanically engages the spring disk 698 in the manner described below. The spacer 700 is disposed coaxially with the axial center line of the piston post 640 and is disposed adjacent the upper surface of the plunger 694. The radial outer edge of the spring disk 698 rests on the annular projection 702 in such a manner that, when the plunger 694 is displaced in a downward direction, the center region of the spring disk 698 is also displaced downward with respect to the periphery of the spring disk 698. When displaced in such a manner, the spring disk 698 causes an upwardly directed biasing force to be placed on the plunger 694.

To secure the spring disk 698 on the upper surface of the plunger 694, a screw 704 is provided. The screw 704 has an externally threaded bore which engages an internally threaded bore portion disposed at the upper portion of an axially extending pressure passage 706 disposed coaxially within the plunger 694. Because the head 708 of the screw 704 is larger than the aperture in the spring disk through which the screw 704 extends, the threaded engagement between the screw 704 and the pressure passage 706 of the plunger 694 causes the spring disk 698 to be secured to the upper surface of the plunger 694. The screw 704 also includes an axially extending pressure passage 710 which is operable to fluidly communicate with the pressure passage 706 in the plunger 694. The pressure passage 710 in the screw 704 allows the pressure of the damping fluid in the pressure passage 706 of the plunger 694 to be transmitted to a pressure sensor described below.

The solenoid 686 further includes a plunger seat 712 having an axially extending flow passages 714 as well as a plurality of radially extending flow passages 716 disposed therein. The radially extending flow passages 716 fluidly communicate with the flow cavity 653 through a first plurality of radially extending flow passages 718 in the piston post 640. The axially extending flow passages 718 are operable to receive damping fluid flowing through the flow passages 716 in the plunger sent 212 when the plunger 694 is disposed upwardly.

The plunger seat 712 is located coaxially on the inner periphery of the piston post 640 and includes a lower annular recess 720 which is able to accommodate a seal 722. The seal 722 is used to prevent the flow of damping fluid between the plunger seat 712 and the inner periphery diameter of the piston post 640. To secure the seal 722 within the lower annular recess 720, an annular washer 724 is provided. The washer 724 is disposed below the seal 722 and above a radially inward extending step portion 726 of the piston post 640.

Disposed within the piston post 640 at a position below the washer 724 is an externally threaded cylindrical plug 728. The externally threaded cylindrical plug 728 is disposed within the lower internal bore portion 730 of the piston post 640. The lower internal bore portion 730 of the piston post 640 is internally threaded so as to be able to threadably engage the external threads of the cylindrical plug 728. The cylindrical plug 728 further has a female key portion 732 which is disposed at the lower end of the cylindrical plug 728. The female key portion 732 is used to allow the cylindrical plug 728 to be rotated into the piston post 640 during assembly.

To allow fluid communication between the axially extending flow passages 714 in the plunger seat 712 and the second radially extending flow passages 680 in the valve body 602, the piston post 640 further has a lower plurality of radially extending flow passages 734. The lower plurality of flow passages 734 fluidly communicate with the axially extending flow passages 714 in the plunger seat 712 by means of a radially upwardly extending flow passage 736 disposed within the cylindrical plug 728, as well as a flow cavity 738 formed between a lower recessed portion 740 of the piston post 640 and the radial external surface of the cylindrical plug 728.

As will be appreciated by those skilled in the art, upward displacement of the plunger 694 causes damping fluid in the upper portion of the working chamber 50 to produce a downward biasing force on the lower annular unloader 654 during rebound. This is produced by the flow of damping fluid through the flow path created by the following flow passage: the axially extending flow passage 634 in the upper annular unloader 624, the axially extending flow passages 648 in the valve body 602, the radially extending flow passage 650 in the valve body 602, the upper flow cavity 653 formed between the piston post 640 and the upper annular recess 652, the first plurality of radially extending flow passages 718 in the piston post 640, the radially extending flow passages 716 in the plunger seat 712, the axially extending flow passage 714 in the plunger seat 712, the radially extending flow passage 736 in the cylindrical plug 728, the lower flow cavity 738 formed between the radially outward diameter of the piston post 640 and the external diameter of the cylindrical plug 728, the plurality of lower flow passages 734 in the piston post 640, the flow cavity 684 formed between the piston post 640 and the valve body 602, the radially extending flow passage 680 in the valve body 602, and the axially extending flow passage 678. Accordingly, when the solenoid 686 is in the upwardmost position, damping fluid is able to flow from the upper portion of the working chamber 50 to the lower annular unloader 654 through the flow path described above thereby causing an increase in the biasing force exerted on the upper face of the lower annular valve disk 674. When this occurs, a downwardly biasing force is generated on the lower annular unloader 654 so as to increase the flow of damping fluid through the second plurality of flow passages 606 so that a soft rebound stroke is generated.

When the plunger 694 is disposed against the plunger seat 712, damping fluid is unable to flow from the flow passage 718 in the piston post 640 to the flow passage 714 in the plunger seat. Accordingly, the pressure of the damping fluid in the flow passage 678 is somewhat less than that which would otherwise be present if the plunger 694 were not seated against the plunger seat 712. Accordingly, the lower annular unloader 654 is not subjected to the additional biasing forces described above and therefore a firm rebound stroke is generated.

During compression, damping fluid from the lower portion of the working chamber 50 is able to flow through the flow passage 664 in the lower annular unloader 654. The force exerted on the lower annular valve disk 674 causes the radially outward portion of the lower annular valve disk 674 to be displaced upward, thereby permitting damping fluid to flow into the flow passage 664. If the plunger 694 is displaced upward against the housing 688 of the solenoid 686, damping fluid is able to flow into the area immediately below the upper annular valve disk 644 from the lower portion of the working chamber 50 through the following flow path: the flow passage 664 in the lower annular unloader 654, the axially extending flow passage 678 in the valve body 602, the second radially extending flow passage 680 in the valve body 602 of the flow cavity 684 formed between the lower annular recess 682 of the valve body 602 and the piston post 640, the lower radial flow passages 734 in the piston post 640, the flow cavity 738 formed between the piston post 640 and the cylindrical plug 728, the radially upward extending flow passage 736 in the plug 728, the axially extending flow passage 714 in the plunger seat 712, the radially extending flow passages 716 in the plunger seat 712, the first plurality of radial flow passages 718 in the piston post 602, the flow cavity 652 formed between the upper annular recess 652 on the interior surface of the valve body 602 and the piston post 640, the first radially extending flow passage 650 in the valve body 602 and the axially extending flow passage 648 in the valve body 602. The resulting pressure formed in the axially extending flow passage 648 causes the upper annular unloader 624 to be displaced in an upward direction thereby causing increased flow of damping fluid through the first plurality of flow passages 604. Since the flow of damping fluid through the first plurality of flow passage 604 is increased, a soft compression stroke is provided. If the plunger 694 is displaced against the plunger seat 712 during compression, damping fluid is unable to flow from the lower portion of the working chamber 50 into the axially extending flow passage 648. Accordingly, a firm compression stroke is generated.

While it will be apparent from the preferred embodiment illustrated herein as well as the objects stated above, it will be appreciated that the present invention is susceptible to modification, variation and change without departing from the scope of the invention. For example, the accelerometers may also be either located within the shock absorbers or mounted externally. Various routines may be used to determine whether the wheels of the automobile are in resonance, and various methods may be used for energizing the solenoid in response to the input signals as well as the desired like characteristics.

What is claimed is:

1. A direct acting hydraulic shock absorber for damping the movement of the body of an automobile comprising:

a pressure cylinder;

a piston assembly disposed for reciprocable movement in said pressure cylinder and operable to divide a working chamber formed by said pressure cylinder into first and second portions, said piston assembly including a valve body having first and second flow passages, said valve body forming a first annular recess adjacent to said first portion of said working chamber and a second annular recess adjacent said second portion of said working chamber;

a first unloader disposed for movement in said first annular recess and having first surface means for controlling the flow of damping fluid from said second portion to said first portion of said working chamber through said first flow passages during compression of said shock absorber, said first unloader forming a third flow passage in fluid communication with said first annular recess;

a first valve disk operable for allowing damping fluid to flow from said first portion of said working chamber through said third flow passage and into said first annular recess during rebound while inhibiting flow of damping fluid from said first annular recess to said first portion of said working chamber through said third flow passage during compression, the pressure of said damping fluid in said first annular recess acting on said first valve disk to control the position of said first surface means of said first unloader with respect to said first flow passages;

first biasing means for biasing said first unloader surface means against said valve body for restricting the flow of damping fluid through said first flow passages;

a second unloader disposed for movement in said second annular recess and having second surface means for controlling the flow of damping fluid from said first portion to said second portion of said working chamber through said second flow passages during rebound of said shock absorber, said second unloader having a fourth flow passage in fluid communication with said second annular recess;

a second valve disk operable for permitting damping fluid to flow from said second portion of said working chamber through said fourth flow passage and into said second annular recess during compression while inhibiting flow of damping fluid from said second annular recess to said second portion of said working chamber through said fourth flow passage during rebound, the pressure of said damping fluid in said second annular recess acting on said second valve disk to control the position of said second surface means of said second unloader with respect to said second flow passages;

second biasing means for biasing said second surface means of said second unloader against said valve body for restricting the flow of said damping fluid through said second flow passages;

a first flow path between said first annular recess and said second annular recess; and electrically controllable flow means operable to regulate the flow of damping fluid between said first and second annular recesses through said first flow path for controlling the position of said first and second unloaders, said electrical controllable flow means comprising a solenoid having a plunger operable to be displaced between first and second positions for controlling the pressure of damping fluid in said first and second annular recesses by selectively limiting the flow of damping fluid through said first flow path, said electrically controllable flow means operable to generate firm damping during compression and rebound by displacing said plunger to said first position.

2. The shock absorber of claim 1, wherein said surface means of said first unloader includes a radially extending portion adapted to mechanically cover an outlet end of said first flow passage for restricting flow of damping fluid therethrough, and wherein said second surface means of said second unloader includes a radially extended portion adapted to mechanically cover an outlet end of said second flow passage for restricting the flow of damping fluid therethrough.

3. The shock absorber of claim 2, wherein the pressure of said damping fluid in said first annular recess is operable to bias said first valve disk and said first unloader in opposition to the biasing force exerted by said first biasing means, and wherein the pressure of said damping fluid in said second annular recess is operable to bias said second valve disk and said second unloader in opposition to the biasing force exerted by said second biasing means.

4. The shock absorber of claim 3, wherein said solenoid further comprises a plunger seat such that the position of said plunger with respect to said plunger seat is operable to control the flow of damping fluid between said first and second annular recesses through said first flow path.

5. The shock absorber of claim 4, further comprising a spring disk operable to bias said plunger toward said second position.

6. The shock absorber of claim 5, wherein said valve body of said piston assembly is mechanically coupled to a piston post, and wherein said first flow path comprises:
 a fifth flow passage formed in said valve body operable to permit fluid communication between said first annular recess and a first flow cavity formed between said valve body and said piston post, said plunger being moveable within a central bore of said piston post;
 a sixth flow passage formed in said valve body operable to permit fluid communication between said second annular recess and a second flow cavity formed between said valve body sand said piston post;
 a seventh flow passage extending through said piston post for providing fluid communication between said first flow cavity and said piston post central bore;
 an eighth flow passage extending through said piston post for fluid communication between said second flow cavity and said piston post central bore; and
 a second flow path fluidly connecting said seventh and eighth flow passages such that when said plunger is displaced to said first position flow of damping fluid through said second flow path between said first and second annular recesses is restricted, whereby said first annular recess is not pressurized during compression and said second annular recess is not pressurized during rebound for causing firm damping, and when said plunger is displaced to said second position damping fluid in said first portion of said working chamber produces a biasing force on said second second valve disk during rebound for moving on said second unloader to cause increase flow through said outlet end of said second flow passage such that a soft rebound stroke is generated, and damping fluid in said second portion of said working chamber produces a biasing force on said first valve disk during compression for moving said first unloader to cause an increase in the flow of damping fluid through said outlet end of said first flow passage such that a soft compression stroke is generated.

7. The shock absorber of claim 6, wherein said piston post central bore is able to receive a cylindrical plug therein, said cylindrical plug and said piston post operable to form a third flow cavity therebetween in fluid communication with said eighth flow passage, and wherein said cylindrical plug has a ninth flow passage formed therein providing fluid communication between said third flow cavity and a tenth flow passage extending through said plunger seat.

8. An apparatus for damping the movement of the body of an automobile relative to a wheel of said automobile, said damping apparatus having a pressure cylinder with a reciprocating piston assembly disposed therein operable to divide a working chamber formed by said pressure cylinder into first and second portions, said damping apparatus comprising:
 a valve body having first and second flow passages for providing fluid communication said first and second portions of said working chamber, said valve body having first and second annular recesses formed therein adjacent said first and second portions of said working chamber, respectively;
 first valve means for controlling the flow of damping fluid through said first flow passage from said second portion to said first portion of said working chamber during compression, said first valve means including a first unloader movably disposed in said first annular recess and having first surface means operable for regulating the flow of fluid through said first flow passage in response to the pressure of said damping fluid acting thereon from within said first annular recess, said first unloader forming a third flow passage for providing fluid communication between said first portion of said working chamber and said first annular recess, said first valve means further including a first valve disk operable for permitting damping fluid to flow from said first portion of said working chamber through said third flow passage during rebound while preventing flow of said damping fluid through said third flow passage during compression;
 first spring means for biasing said first surface means of said first unloader to mechanically cover said first flow passage for restricting flow of damping fluid therethrough;
 second valve means for controlling the flow of damping fluid through said second flow passage from said first portion to said second portion of said working chamber during rebound, said second valve means including a second unloader movably disposed in said second annular recess and having second surface means operable for regulating the flow of damping fluid through said second flow passage in response to the pressure of said damping fluid acting thereon within said second annular recess, said second unloader forming a fourth flow passage for providing fluid communication between said second portion of said working chamber and said second annular recess, said second valve means further including a second valve disk operable for permitting damping fluid to flow from said second portion of said working chamber through said fourth flow passage during compression while preventing flow of damping fluid through said fourth flow passage during rebound;

second spring means for biasing said second surface means of said second unloader to mechanically cover said second flow passage so as to restrict flow of damping fluid therethrough;

a first flow path between said first and second annular recesses; and electrically controllable flow means operable to regulating the flow of damping fluid through said first flow path and between said first and second annular recesses, said electrical controllable flow means comprising a solenoid having a plunger operable to be displaced in first and second positions, said plunger operable for generating firm damping during compression and rebound by inhibiting the flow of damping fluid through said first flow path when said plunger is in said first position.

9. The damping apparatus of claim 8, wherein said first surfaces means of said first unloader includes a radially extending flange portion biased by said first spring means to engage an upper portion of said valve body for covering an outlet of said first flow passage, and wherein said second surfaces means of said second unloader includes a radially extending flange portion biased by said second spring means to engage a lower surface of said valve body for covering an outlet of said second flow passage.

10. The damping apparatus of claim 9, wherein when said plunger is in said first position during rebound, flow of fluid from said first portion of said working chamber to said second annular recess is prevented such that the biasing of said second spring means is greater than the pressure acting in said second annular recess for biasing said radially extending flange portion of said second unloader toward said outlet of said second flow passage for causing a firm rebound stroke, and wherein when said plunger is in said second displaced position during rebound said first valve disk is displaced to permit fluid from said first portion of said working chamber to flow through said third flow passage and said first annular recess and said first flow path into said second annular recess for causing an increased biasing forced to be exerted on said second valve disk and said second unloader in opposition to said second spring means for displacing said radially extending flange portion of said second unloader relative to said outlet of said second flow passage for permitting increased flow therethrough for defining a soft rebound stroke.

11. The damping apparatus of claim 9, wherein when said plunger is displaced to said second position during compression said first annular recess is pressurized, whereby the fluid pressure acting on said first valve disk and said first unloader within said first annular recess overcomes the biasing force exerted by said first spring means such that said radially extending flange portion of said first unloader is displaced away from said outlet of said first flow passage whereby increased flow is permitted therethrough for generating a soft compression stroke, and when said plunger is displaced to said first position during compression said first annular recess is not pressurized whereby the fluid pressure acting on said first valve disk and said first unloader within said first annular recess is less than the biasing force exerted by said first spring means such that said radially extending flange portion of said first unloader is biased toward said outlet of said first flow passage for decreasing the flow therethrough so as to generate a firm compression stroke.

12. The damping apparatus of claim 9, wherein said first valve disk is positioned below said first unloader within said first annular recess, and wherein said second valve disk is disposed within said second annular recess above said second unloader.

13. The damping apparatus of claim 9, wherein said plunger is movable relative to a plunger seat such that the position of said plunger with respect to said plunger seat is operable to control the flow of damping fluid between said first and second annular recesses through said first flow path, and wherein said valve body is coupled for reciprocal movement within said pressure cylinder to a post portion of a piston rod, said first flow path includes:

an upper flow cavity formed between said valve body and said piston post;

a fifth flow passage fluidly interconnecting said first annular recess and said upper flow cavity;

a lower flow cavity formed between said valve body and said piston post;

a sixth flow passage fluidly interconnecting said second annular recess and said lower flow cavity;

a seventh flow passage extending through said piston post for providing fluid communication between said upper flow cavity and a central bore formed in said piston past;

an eighth flow passage extending through said piston post for providing fluid communication between said lower flow cavity and said piston post central bore, said plunger being located in said piston post central bore intermediate said seventh and eighth flow passages; and a second flow path for fluidly interconnecting said seventh flow passage and said eighth flow passage, such that said second flow path is operable to permit fluid flow between said upper and lower flow cavities in response to the position of said plunger with respect to said plunger seat.

14. The damping apparatus of claim 13, wherein said piston post central bore is able to receive a cylindrical plug therein that is located below said plunger seat, said cylindrical plug and piston post operable to form a third flow cavity therebetween provided in fluid communication with said eighth flow passage, and wherein said second flow path includes a ninth flow passage formed in said cylindrical plug providing fluid communication between said third flow cavity and a tenth flow passage extending through said plunger seat.

15. A piston assembly for use in a hydraulic damper adapted for damping the movement of the body of an automobile relative to a wheel of said automobile, said piston assembly disposed for reciprocating motion within a pressure cylinder and operable to divide the working chamber formed by said pressure cylinder into first and second portions, said piston assembly comprising:
- a piston valve body having first and second flow passages, said valve body forming a first annular recess adjacent to said first portion of said working chamber and a second annular recess adjacent said second portion of said working chamber;
- a first unloader disposed for movement in said first annular recess and having first surface means for controlling the flow of damping fluid through said first flow passage during compression, said first unloader forming a third flow passage in fluid communication with said first annular recess;
- a first valve disk operable for allowing damping fluid to flow from said first portion of said working chamber through said third flow passage and into said first annular recess during rebound while inhibiting flow of damping fluid from said first annular recess to said first portion of said working chamber through said third flow passage during compression, the pressure of said damping fluid in said first annular recess acting on a lower surface of said first unloader for controlling the position of said first surface means of said first unloader relative to said first flow passages;
- first biasing means for biasing said first surface means of said first unloader against an upper surface of said valve body for restricting the flow of damping fluid through said first flow passage;
- a second unloader disposed for movement in said second annular recess and having second surface means for controlling the flow of damping fluid through said second flow passage during rebound, said second unloader having a fourth flow passage and fluid communication with said second annular recess;
- a second valve disk operable for permitting fluid communication between said fourth flow passage and said second annular recess during compression while inhibiting flow of damping fluid from said second annular recess to said second portion of said working chamber through said fouth flow passage during rebound, the pressure of said damping fluid in said second annular recess acting on an upper surface of said second unloader for controlling the position of said second surface means of said second unloader relative to said second flow passages;
- second biasing means for biasing said second surface means of said second unloader against a lower surface of said valve body for restricting the flow of said damping fluid through said second flow passage; and
- a first flow path between said first annular recess and said second annular recess, said first flow path including a fifth flow passage formed in said piston valve body operable to permit fluid communication between said first annular recess and a first flow cavity formed between said valve body and a piston post member, said piston post member having a central bore formed therein;
- a sixth flow passage formed in said valve body operable to permit fluid communication between said second annular recess and a second flow cavity formed between said valve body and said piston post;
- a seventh flow passage extending through said piston post for providing fluid communication between said fifth flow passage and said piston post central bore;
- an eighth flow passage extending through said piston post for providing fluid communication between said sixth flow passage and said piston post central bore;
- a second flow path interconnecting said seventh and eighth flow passages; and
- movable plunger means disposed within said piston post central bore for movement between a first position inhibiting flow of damping fluid through said second flow path and a first position permitting flow of damping fluid through said second flow path, whereby said plunger means is operable for generating firm damping in compression and rebound in said first position.

16. The piston assembly of claim 15, where said second flow path includes a ninth flow passage extending through a plunger seat disposed in said piston post central bore, a third flow cavity formed between said piston post central bore and a cylindrical plug disposed in said central bore below said plunger seat, said third flow cavity fluidly communicating with said eighth flow passage, and a tenth flow passage formed in said plug for providing fluid communication between said ninth flow passage and said third flow cavity, said plunger means operable to control flow through said ninth flow passage.

17. The piston assembly of claim 16, wherein said movable plunger means is a solenoid apparatus disposed within said central bore of said piston post which is operable for controlling the pressure of said damping fluid acting within said first and second annular recess by selectively limiting the flow of damping fluid through said ninth flow passage.

18. The piston assembly of claim 17, wherein said first surface means of said first unloader includes a radially extending flange portion adapted to mechanically cover an outlet end of said first flow passage for restricting flow of damping fluid therethrough, and wherein said second surface means of said second unloader includes a radially extending flange portion adapted to mechanically cover an outlet end of said second flow passage for restricting the flow of damping fluid therethrough.

19. The piston assembly of claim 18, wherein when said plunger means is in said first position during rebound, flow of fluid from said first portion of said working chamber to said second annular recess is prevented such that the biasing force exerted by said second spring means on said second unloader is greater than the fluid pressure acting in said second annular recess whereby said radial flange portion of said second unloader is biased toward said outlet of said second flow passage for causing a firm rebound stroke, and wherein when said plunger is in said second displaced position during rebound said first valve disk is displaced to permit fluid from said first portion of said working chamber to flow through said third flow passage and said first annular recess and said first and second flow paths into said second annular recess for exerting an increased biasing force on said second unloader in opposition to the biasing exerted by said second spring means for displacing said radially extending flange portion of said second unloader relative to said second flow passage for permitting increased flow therethrough for defining a soft rebound stroke.

* * * * *

UNITED STATES PATENT AND TRADEMARK OFFICE
CERTIFICATE OF CORRECTION

PATENT NO. : 5,092,626                (Page 1 of 3)
DATED : March 3, 1992
INVENTOR(S) : David S. Athanas et al.

It is certified that error appears in the above-identified patent and that said Letters Patent is hereby corrected as shown below:

ON THE TITLE PAGE, in the Abstract, line 8,
"passage" should be --passages--.

ON THE TITLE PAGE, in the Abstract, line 22,
"thorugh" should be --through--.

Column 2, line 20,
after "an", delete "and".

Column 2, line 46,
before "an", delete "a".

Column 2, line 67,
"is" should be --are--.

Column 3, line 11,
"is" should be --are--.

Column 4, line 3,
"while" should be --While--.

Column 5, line 35,
"connector" should be --connectors--.

Column 7, line 58,
"a" should be --an--.

Column 10, line 63,
"a" should be --an--.

UNITED STATES PATENT AND TRADEMARK OFFICE
CERTIFICATE OF CORRECTION

PATENT NO. : 5,092,626

DATED : March 3, 1992

INVENTOR(S) : David S. Athanas et al.

It is certified that error appears in the above-identified patent and that said Letters Patent is hereby corrected as shown below:

Column 11, line 31,
"bias" should be --biases--.

Column 12, line 60,
"path" should be --flow--.

Column 15, lines 53 - 54,
"[Tenneco case No. 1316N-01494]" should be --U.S. Patent No. 4,943,083--.

Column 19, line 17,
"characteristics" should be --characteristic--.

Column 23, line 42,
"execute" should be --executes--.

Column 29, line 21,
delete "and" (second occurrence).

Column 29, line 63,
after "having", delete "an".

Column 30, line 2,
"sent" should be --seat--.

Column 30, line 46,
"passage:" should be --passages:--.

UNITED STATES PATENT AND TRADEMARK OFFICE
CERTIFICATE OF CORRECTION

PATENT NO. : 5,092,626 (Page 3 of 3)
DATED : March 3, 1992
INVENTOR(S) : David S. Athanas et al.

It is certified that error appears in the above-identified patent and that said Letters Patent is hereby corrected as shown below:

Column 33, line 55, claim 6,
 "sand" should be --and--.

Column 34, line 7, claim 6,
 delete "second" (second occurrence).

Column 34, line 8, claim 6,
 after "moving", delete "on".

Column 34, line 35, claim 8,
 after "communication", insert --between--.

Column 35, line 55, claim 10,
 "forced" should be --force--.

Column 36, line 40, claim 13,
 "past" should be --post--.

Signed and Sealed this

Nineteenth Day of October, 1993

*Attest:*

BRUCE LEHMAN

*Attesting Officer*  *Commissioner of Patents and Trademarks*